US012560441B2

(12) United States Patent
Beaurepaire et al.

(10) Patent No.: US 12,560,441 B2
(45) Date of Patent: Feb. 24, 2026

(54) METHOD AND APPARATUS FOR OPTIMIZING A MULTI-STOP TOUR WITH FLEXIBLE MEETING LOCATIONS

(71) Applicant: HERE Global B.V., Eindhoven (NL)

(72) Inventors: Jerome Beaurepaire, Berlin (DE); Remco Timmer, Amsterdam (NL)

(73) Assignee: HERE Global B.V., Eindhoven (NL)

( * ) Notice: Subject to any disclaimer, the term of this patent is extended or adjusted under 35 U.S.C. 154(b) by 591 days.

(21) Appl. No.: 17/739,890

(22) Filed: May 9, 2022

(65) Prior Publication Data

US 2023/0358551 A1    Nov. 9, 2023

(51) Int. Cl.
*G01C 21/34* (2006.01)
*G01C 21/36* (2006.01)

(52) U.S. Cl.
CPC ....... *G01C 21/343* (2013.01); *G01C 21/3605* (2013.01); *G01C 21/3694* (2013.01)

(58) Field of Classification Search
CPC .............. G01C 21/343; G01C 21/3605; G01C 21/3694; G01C 21/3423; G01C 21/3438; G01C 21/3446
See application file for complete search history.

(56) References Cited

U.S. PATENT DOCUMENTS

| | | | | |
|---|---|---|---|---|
| 8,095,303 | B1 * | 1/2012 | Nesbitt ................ | G01C 21/343 340/988 |
| 9,689,695 | B2 | 6/2017 | Margalit et al. | |
| 10,346,766 | B1 * | 7/2019 | Yao ...................... | G06Q 10/083 |
| 11,067,410 | B2 | 7/2021 | Lee | |
| 2008/0162042 | A1 * | 7/2008 | Huber .................. | G01C 21/343 701/431 |
| 2010/0211308 | A1 * | 8/2010 | Zheng ................... | G01C 21/20 707/E17.05 |
| 2014/0074743 | A1 * | 3/2014 | Rademaker ........ | G06Q 30/0601 705/334 |
| 2016/0195403 | A1 * | 7/2016 | Tuukkanen ........ | G01C 21/3423 701/533 |
| 2019/0147408 | A1 | 5/2019 | Renaud et al. | |
| 2020/0124426 | A1 * | 4/2020 | Beaurepaire .......... | G06Q 10/02 |
| 2020/0217674 | A1 | 7/2020 | Lacaze et al. | |
| 2020/0378771 | A1 * | 12/2020 | Beaurepaire ....... | G01C 21/3423 |
| 2021/0256432 | A1 | 8/2021 | Ross et al. | |

* cited by examiner

*Primary Examiner* — Faris S Almatrahi
*Assistant Examiner* — Dana F Artimez
(74) *Attorney, Agent, or Firm* — DITTHAVONG, STEINER & MLOTKOWSKI

(57)    ABSTRACT

An approach is provided for providing a navigation route for a requesting entity to meet other entities at flexible meeting locations. The approach, for example, involves receiving a request to generate a navigation route to visit a plurality of entities, wherein one or more mobile entities of the plurality of entities are capable of moving from a current location during the navigation route. The approach also involves computing respective isolines around each mobile entity based on a travel distance, a travel time, or a combination thereof that each mobile entity is ready to travel from the current location of each mobile entity during the navigation route. The approach further involves connecting the respective isolines around each mobile entity to determine the navigation route. The approach further involves providing the navigation route as an output.

20 Claims, 16 Drawing Sheets

200

Requesting Participant Navigation Route 207

Other Participant Navigation Routes 209a–209d

Travelling Salesman Route 208

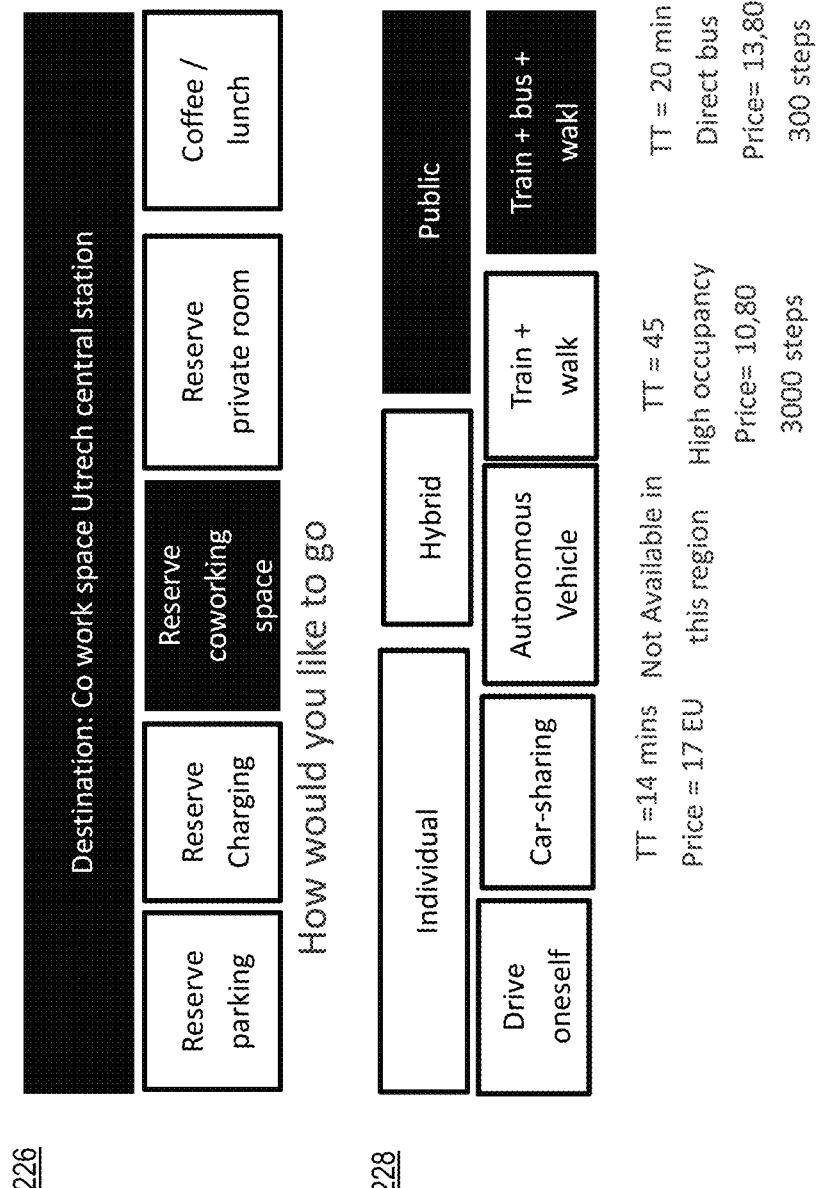

226

Destination: Co work space Utrech central station

Reserve parking | Reserve Charging | Reserve coworking space | Reserve private room | Coffee / lunch How would you like to go

228

Individual | Hybrid | Public

Drive oneself | Car-sharing | Autonomous Vehicle | Train + walk | Train + bus + wakl TT =14 mins
Price = 17 EU Not Available in this region TT = 45
High occupancy
Price= 10,80
3000 steps TT = 20 min
Direct bus
Price= 13,80
300 steps Customize and book your journey

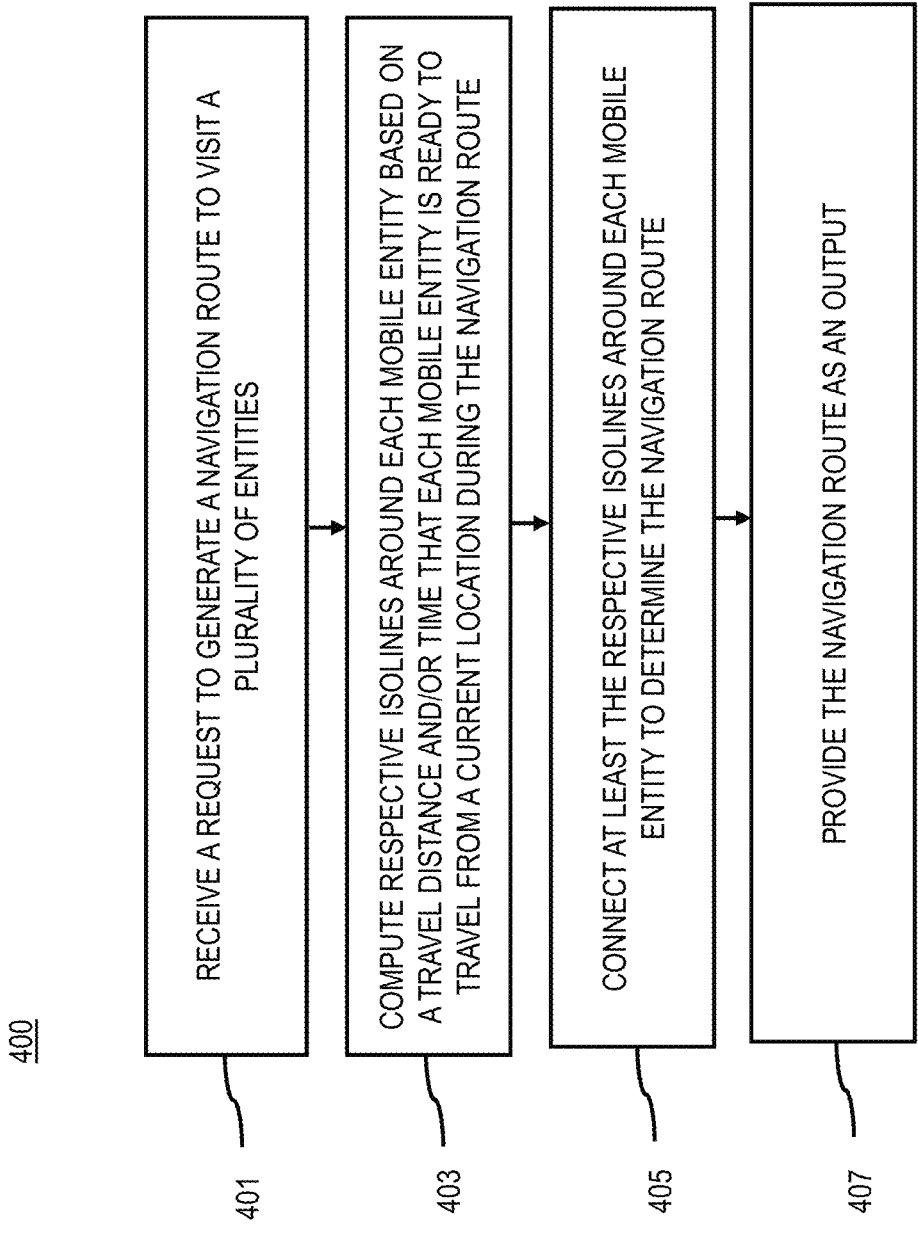

401 — RECEIVE A REQUEST TO GENERATE A NAVIGATION ROUTE TO VISIT A PLURALITY OF ENTITIES

403 — COMPUTE RESPECTIVE ISOLINES AROUND EACH MOBILE ENTITY BASED ON A TRAVEL DISTANCE AND/OR TIME THAT EACH MOBILE ENTITY IS READY TO TRAVEL FROM A CURRENT LOCATION DURING THE NAVIGATION ROUTE

405 — CONNECT AT LEAST THE RESPECTIVE ISOLINES AROUND EACH MOBILE ENTITY TO DETERMINE THE NAVIGATION ROUTE

407 — PROVIDE THE NAVIGATION ROUTE AS AN OUTPUT

METHOD AND APPARATUS FOR OPTIMIZING A MULTI-STOP TOUR WITH FLEXIBLE MEETING LOCATIONS

BACKGROUND

Location-based service providers (e.g., mapping and navigation providers) are continually challenged to provide compelling services and applications. One area of development relates to providing users navigation support when traveling and/or wanting to visit multiple entities, i.e., a multi-stop tour, such as the traveling salesman problem (TSP). However, as the numbers of entities (e.g., customers) increase, service providers face significant technical challenges associated with computing a navigation route for a requesting entity, to minimize route cost factors (e.g., time, distance, etc.).

Some Example Embodiments

Therefore, there is a need for a new approach for optimizing a solution for a multi-stop tour problem, such as by suggesting flexible meeting locations considering each meeting entity's constrains (e.g., a distance/time to travel, available mode(s) of transport, etc.).

According to one embodiment, a method comprises receiving a request to generate a navigation route to visit a plurality of entities. One or more mobile entities of the plurality of entities are capable of moving from a current location during the navigation route. The method also comprises computing respective isolines around each mobile entity based on a travel distance, a travel time, or a combination thereof that each mobile entity is ready to travel from the current location of each mobile entity during the navigation route. The method further comprises connecting at least the respective isolines around each mobile entity to determine the navigation route. The method further comprises providing the navigation route as an output.

According to another embodiment, an apparatus comprises at least one processor, and at least one memory including computer program code for one or more computer programs, the at least one memory and the computer program code configured to, with the at least one processor, cause, at least in part, the apparatus to receive a request to generate a navigation route to visit a plurality of entities. One or more mobile entities of the plurality of entities are capable of moving from a current location during the navigation route. The apparatus is also caused to compute respective isolines around each mobile entity based on a travel distance, a travel time, or a combination thereof that each mobile entity is ready to travel from the current location of each mobile entity during the navigation route. The apparatus is further caused to connect at least the respective isolines around each mobile entity to determine the navigation route. The apparatus is further caused to provide the navigation route as an output.

According to another embodiment, a computer-readable storage medium carries one or more sequences of one or more instructions which, when executed by one or more processors, cause, at least in part, an apparatus to receive a request to generate a navigation route to visit a plurality of entities. One or more mobile entities of the plurality of entities are capable of moving from a current location during the navigation route. The apparatus is also caused to compute respective isolines around each mobile entity based on a travel distance, a travel time, or a combination thereof that each mobile entity is ready to travel from the current location of each mobile entity during the navigation route. The apparatus is further caused to connect at least the respective isolines around each mobile entity to determine the navigation route. The apparatus is further caused to provide the navigation route as an output.

According to another embodiment, a computer program product may be provided. For example, a computer program product comprising instructions which, when the program is executed by a computer, cause the computer to receive a request to generate a navigation route to visit a plurality of entities. One or more mobile entities of the plurality of entities are capable of moving from a current location during the navigation route. The computer is also caused to compute respective isolines around each mobile entity based on a travel distance, a travel time, or a combination thereof that each mobile entity is ready to travel from the current location of each mobile entity during the navigation route. The computer is further caused to connect at least the respective isolines around each mobile entity to determine the navigation route. The computer is further caused to provide the navigation route as an output According to another embodiment, an apparatus comprises means for receiving a request to generate a navigation route to visit a plurality of entities. One or more mobile entities of the plurality of entities are capable of moving from a current location during the navigation route. The apparatus also comprises means for computing respective isolines around each mobile entity based on a travel distance, a travel time, or a combination thereof that each mobile entity is ready to travel from the current location of each mobile entity during the navigation route. The apparatus further comprises means for connecting at least the respective isolines around each mobile entity to determine the navigation route. The apparatus further comprises means for providing the navigation route as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 2B-2G are diagrams of user interfaces showing a process of generating a navigation route for a requesting entity to meet other entities at flexible meeting locations, according to various embodiments;

FIG. 4 is a flowchart of a process for providing a navigation route for a requesting entity to meet other entities at flexible meeting locations, according to one embodiment;

DESCRIPTION OF SOME EMBODIMENTS

Examples of a method, apparatus, and computer program for providing a navigation route for a requesting entity to meet other entities at flexible meeting locations are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
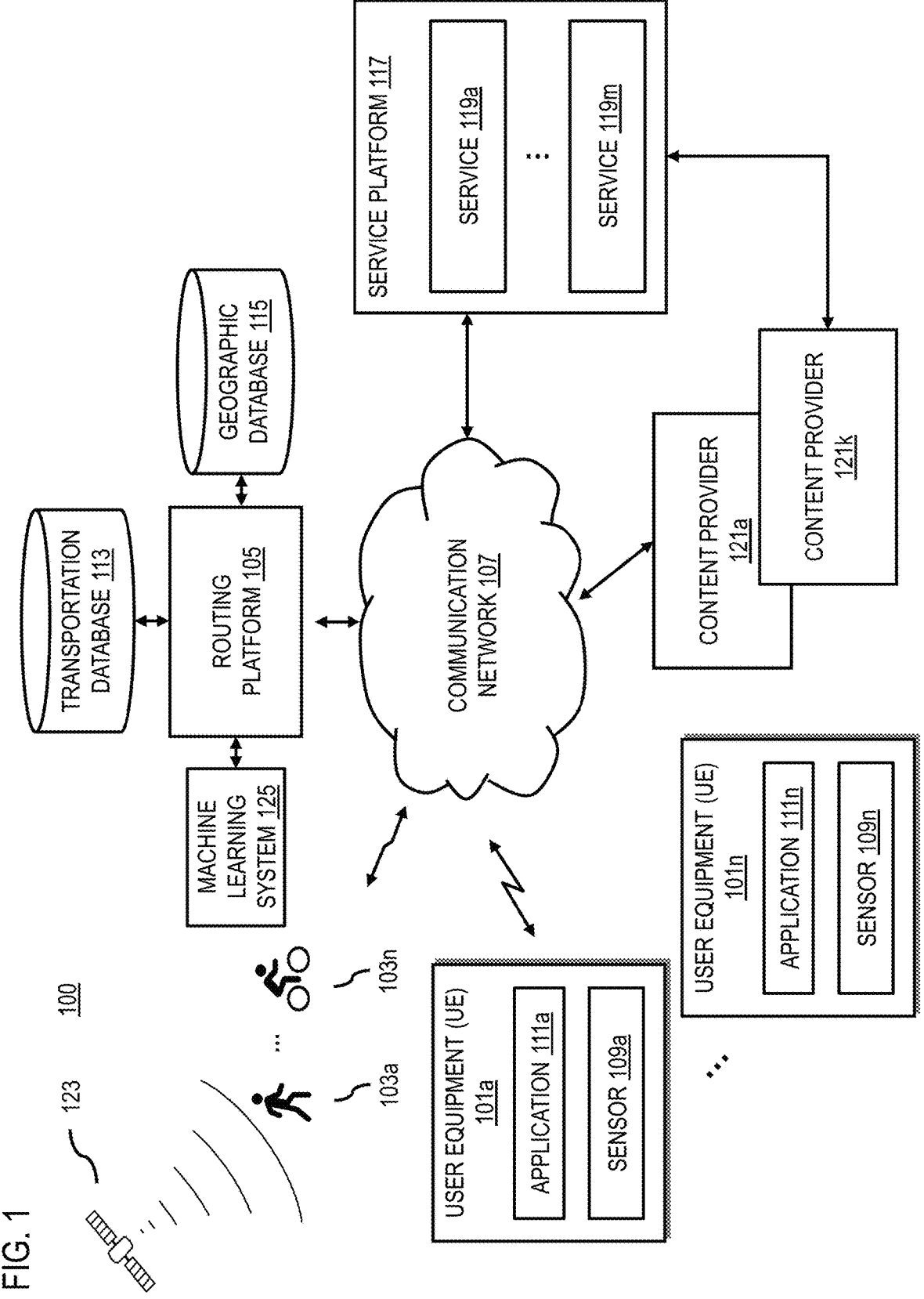
FIG. 1 is a diagram of a system for providing a navigation route for a requesting entity to meet other entities at flexible meeting locations, according to one embodiment.

FIG. 1 is a diagram of a system for providing a navigation route for a requesting entity to meet other entities at flexible meeting locations, according to one embodiment. Such a multi-stop tour can address scenarios beyond the TSP problem. The TSP calculates a shortest route for a requesting participant A (e.g., a salesperson) to visit N participants (e.g., customers) at fixed locations. However, the TSP fails to consider a scenario that one or more of the N participants may be ready to travel for some distance/time to meet the requesting participant A, in order to optimize meeting efficiency. For instance, some of the customers may have flexible schedules, modes of transport, etc. to travel to locations other than their offices or stores to meet the requesting participant A. In this case, the requesting participant A requests the system 100 to plan the multi-stop tour to meet other participants, and usually travels further than other participants. In addition, the customers may be more familiar with their neighboring areas and, therefore, can save time by accommodating/moving towards the requesting participant A. Such flexible meeting location optimization can be applicable to other types of meetings than sales meetings. For example, a worker can visit other co-workers on a daily standup meeting at a flexible location and/or along a walking path in an office complex. Daily standup meetings are popular for software development daily team meetings to update development status and challenges as well as to coordinate efforts to issues. As another example, a person can meet friends on a biking path in a city for a ride and/or various activities (e.g., eating lunch, seeing a play, watching a sport match, etc.).

To optimize a navigation route for the multi-stop tour with flexible meeting locations, a system 100 of FIG. 1 introduces a capability to provide the navigation route for a requesting entity to meet other entities at flexible meeting locations based on constrains (e.g., a distance/time to travel, available mode(s) of transport, etc.) of each meeting entity and map data. In one embodiment, the system 100 can allow participants in a multi-stop tour scenario to optimize their entire route by suggesting participants (other than a requesting participant) to move according to an optimal path for a requesting participant A to meet other N participants.

Figure 2A:
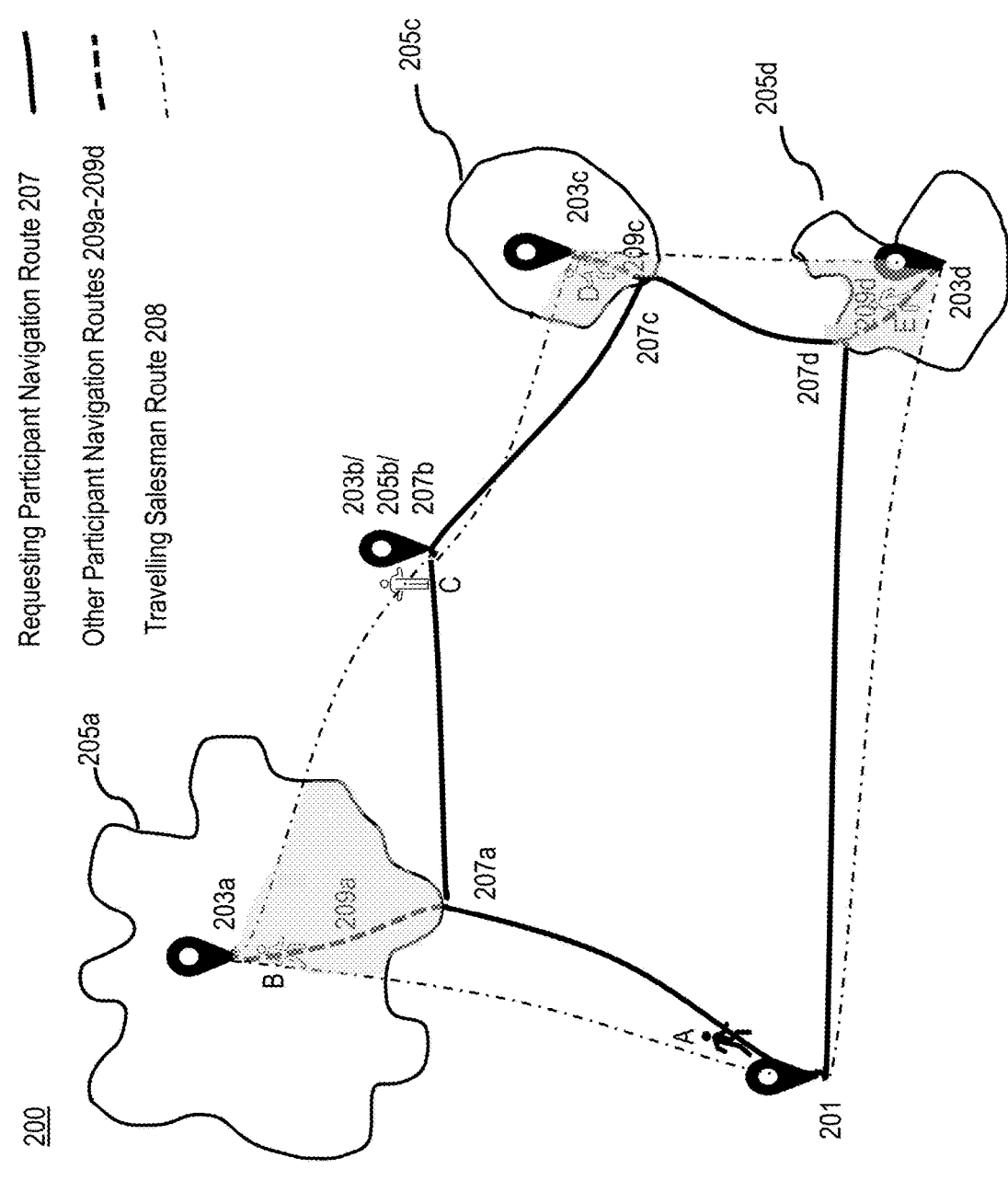
FIG. 2A is a diagram showing navigation routes taken by a requesting entity and by other entities, according to one embodiment.

By way of example, FIG. 2A is a diagram 200 showing navigation routes taken by a requesting entity (e.g., the requesting participant A at a starting location 201) and by other entities (e.g., other participants N), according to one embodiment. To simplify the discussion, the available mode of transport for all participants is walking, and the N participants (e.g., participants B-E) are at respective locations 203a-203d. Each of the N participants are ready to walk to a maximum distance of X meters to meet the requesting participant A on her/his optimal path. For instance, such maximum distances X can be expressed as isolines 205a-205d. X can be different for each participant, or even 0 m (e.g., for participant C). When the X=0, the isolines 205b reduces to the current location 203b of participant C. The system 100 can apply an isoline routing algorithm to provide such isoline, e.g., a polyline that connects the end points of all routes leaving from a respective current location of each of the participants B-E with either a specified travel distance (e.g., a maximum walking distance of 500 meters) or a specified travel time (e.g., a maximum waiting time of 10 minutes).

The system 100 can then draw a polygon going through all of those isolines 205a-205d created around the locations 203a-203d. For instance, the system 100 can connect the respective isolines 203a-203d around each participants B-E using a convex hull to determine a navigation route 207 for the requesting participant A to meet participants B-E then back to the starting location 201 (e.g., homes, another event location, etc.). In FIG. 2A, the requesting user navigation route 207 starts from the starting location 201, passes via flexible meeting locations 207a, 207b (i.e., 203b), 207c, and 207d, and then back to the starting location 201. All vertices of the polygon 207 (e.g., the meeting locations 207a-207d) maximize the polygon area while minimizing the circumference, i.e., the shortest walking distance of the requesting participant A from and then back to the starting location 201.

In FIG. 2A, the requesting participant navigation route 207 is shorter than a traveling salesman route 208 that is calculated based on a shortest path via the current locations 203a-203d of the participants B-E back to the starting location 201. The system 100 can further calculate other participant navigation routes 209a-209d to guide the participants B-E to meet the requesting participant A at the flexible meeting locations 207a, 207b (i.e., 203b), 207c, and 207d.

In another embodiment, a requesting user navigation route can end at the meeting location, rather than leading back to the starting location 201. In this case, the system 100 adjusts the computation criteria for deciding the flexible meeting locations as minimizing the walking distance of the requesting participant A from the starting location 201 via other flexible meeting locations then stops at another meeting location. The other flexible meeting locations (not shown) may not coincide with the flexible meeting locations 207a-207d.

In other embodiments, the system 100 can consider other available modes of transport than walking for each participant, such as jogging, a public transport, a private vehicle, a shared vehicle, an autonomous vehicle, a taxi, a ride-hailing service, or a combination thereof (e.g., multimodal transportation options (i.e., options using multiple different modes of transport). The applications of multiple different modes of transport individually or in combinations can involve respective isolines (e.g., a jogging isoline, a bus isoline, etc.) or combined isolines (e.g., a jogging+bus isoline).

Beside a shortest distance for the requesting participant A to meet participants B-E, the system 100 can consider one or more other cost factors to optimize the navigation route for at least one of the requesting entity, one or more of the other entities, or a combination thereof (optionally based on a priority among the entities, the meetings, etc.), such as a shortest travel time, max/min user exercise (e.g., walking 3000 steps), fuel consumption, tolls, admissions, scenery, privacy, weather, noise, traffic, or a combination thereof. For instance, the system 100 can optimize participant A's estimate time of arrival (e.g., back to the starting location) with large flexibility (e.g., big isoline radius) of the participants B-E. As another instance, the system 100 can optimize one or more of the navigation routes of the participants B-E by minimizing disturbance to the respective participant(s), e.g., minimizing the isoline radius around the respective participant(s). By way of example, the system 100 minimizes participants A or a primary participant's travel time (or route or other routing cost function parameter such as distance, fuel efficiency, etc.) to a flexible meeting location by considering all possible modes of transport (e.g., walking, buses, trains, cars, etc.) along the shortest route to the flexible meeting location.

As another instance, the system 100 can optimize participant A's navigation route by choosing scenic route(s) for the participants B-E to increase their probability of accepting participant A's meeting request(s) on the navigation route.

In other embodiments, the entities can include one or more autonomous vehicles, one or more drones/robots, etc., that can move to meet the requesting entity to deliver participant(s), package(s), etc. In addition to transporting human participants (e.g., clients, co-workers, friends, students, etc.), the modes of transport can be cargo/package delivery trucks, food trucks, garbage trucks, police cars, etc. which delivery objects and may benefit from considering their capabilities and attributes to find the navigation route with flexible meeting locations to delivery or pick-up.

In other embodiments, the system 100 can consider more than one participant for the participant A to meet at a flexible meeting location.

In one embodiment, the system 100 can determine the participant's need for reserving a mode of transport from the navigation route(s) calculated based on the above-discussed embodiments. In another embodiment, the system 100 can detect a participant travel pattern/habit and/or mobility graph (e.g., data indicating a history of user movements or locations) and predicts the participant's preferences and/or need for reserving a mode of transport to reach a flexible meeting location.

In other embodiments, the system 100 can consider other constrains such as schedules of the entities, a need to pick up food during walks happening at lunch time, a need to get food delivered at a planned stopover, etc., and then adjust the flexible meeting locations based on estimated locations of the participants. An estimated locations can be determined based on a probability of how likely the participant arrive there at a respective time point exceeding a threshold probability value. The system 100 can query the user equipment 101a-101n (also collectively referred to as UEs 101) of the participants for their estimated locations directly, or for the schedule data, mobility data, etc. of the participants for calculating the estimated locations. The system 100 then can output an optimal path for the requesting participant A, together with a list of flexible meeting locations and times for the participants B-E to go to in case of FIG. 2A.

FIGS. 2B-2E are diagrams of user interfaces showing a process of generating a navigation route for a requesting entity to meet other entities at flexible meeting locations, according to various embodiments.

Figure 2B:
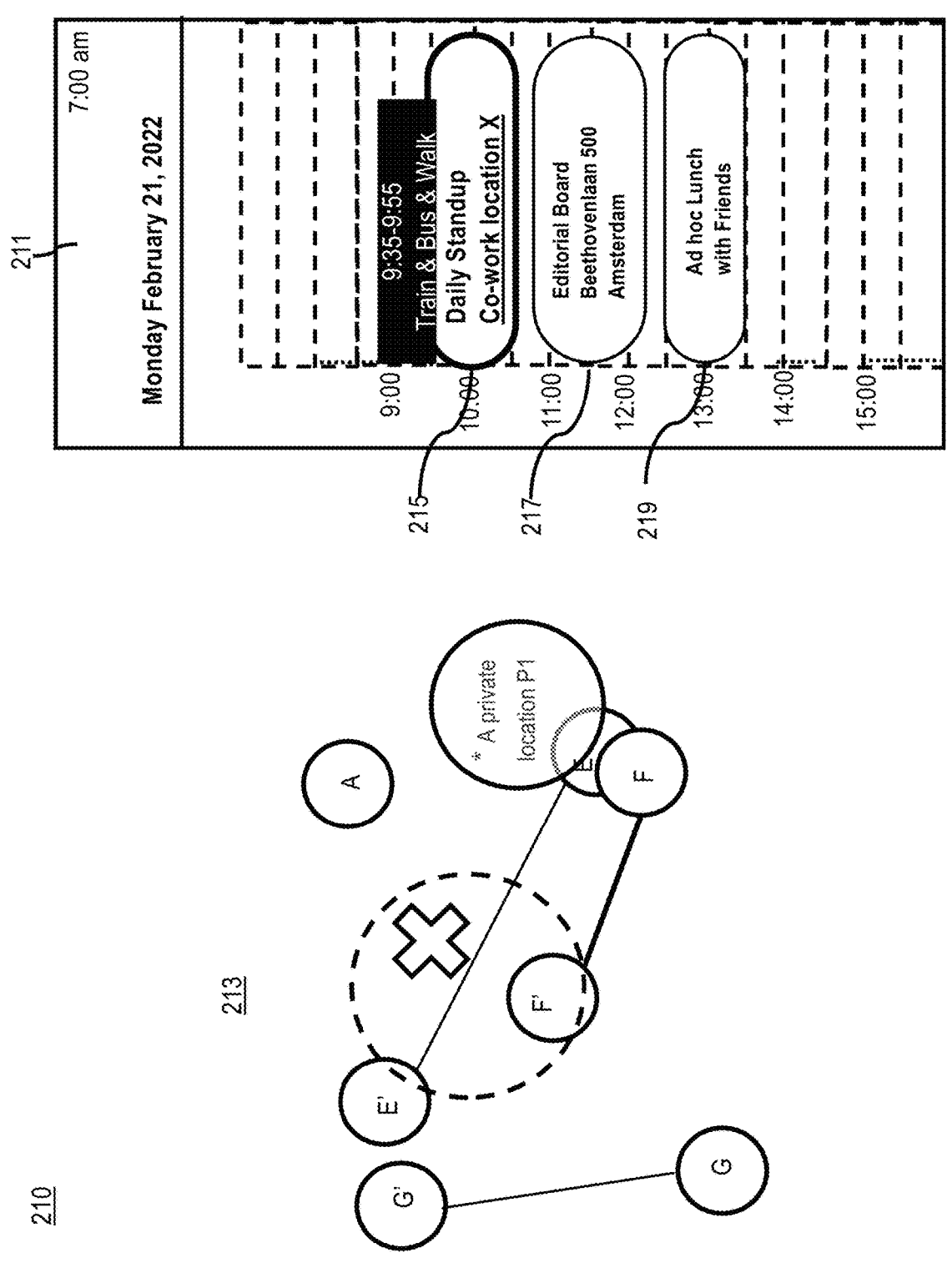

FIG. 2B depicts in a user interface 210 that includes a calendar view 211 of participant A's appointments on the right and a map view 213 of flexible meeting locations with other participants on, for example, on Monday Feb. 21, 2022. The calendar view 211 includes a current time box (e.g., Monday Feb. 21, 2022, 7:00 am), three user appointments, including an appointment 215 of a daily standup meeting at 10:00 am, an appointment 217 of with the editorial board during 11:00-12:00 noon, and an appointment 219 of an ad hoc lunch with friends from 13:00. The process of determining the flexible meeting location of the standup appointment 215 will be described in conjunction with FIGS. 2C-2D, while the process of determining the flexible meeting location and time of the ad hoc lunch appointment 219 will be described in conjunction with FIGS. 2E-2G.

In FIG. 2B, the calendar view 211 highlights the daily standup meeting appointment 215, and shows a multimode of transport of Train+Bus+Walk during 9:35-9:55 am from the current location of the participant A's to reach a co-work space X for the daily standup meeting appointment 215 at 10:00 am. The meeting location and mode(s) of transport for participant A shown in FIG. 2B can be determined based on the process depicted in FIG. 2C.

Figure 2C:
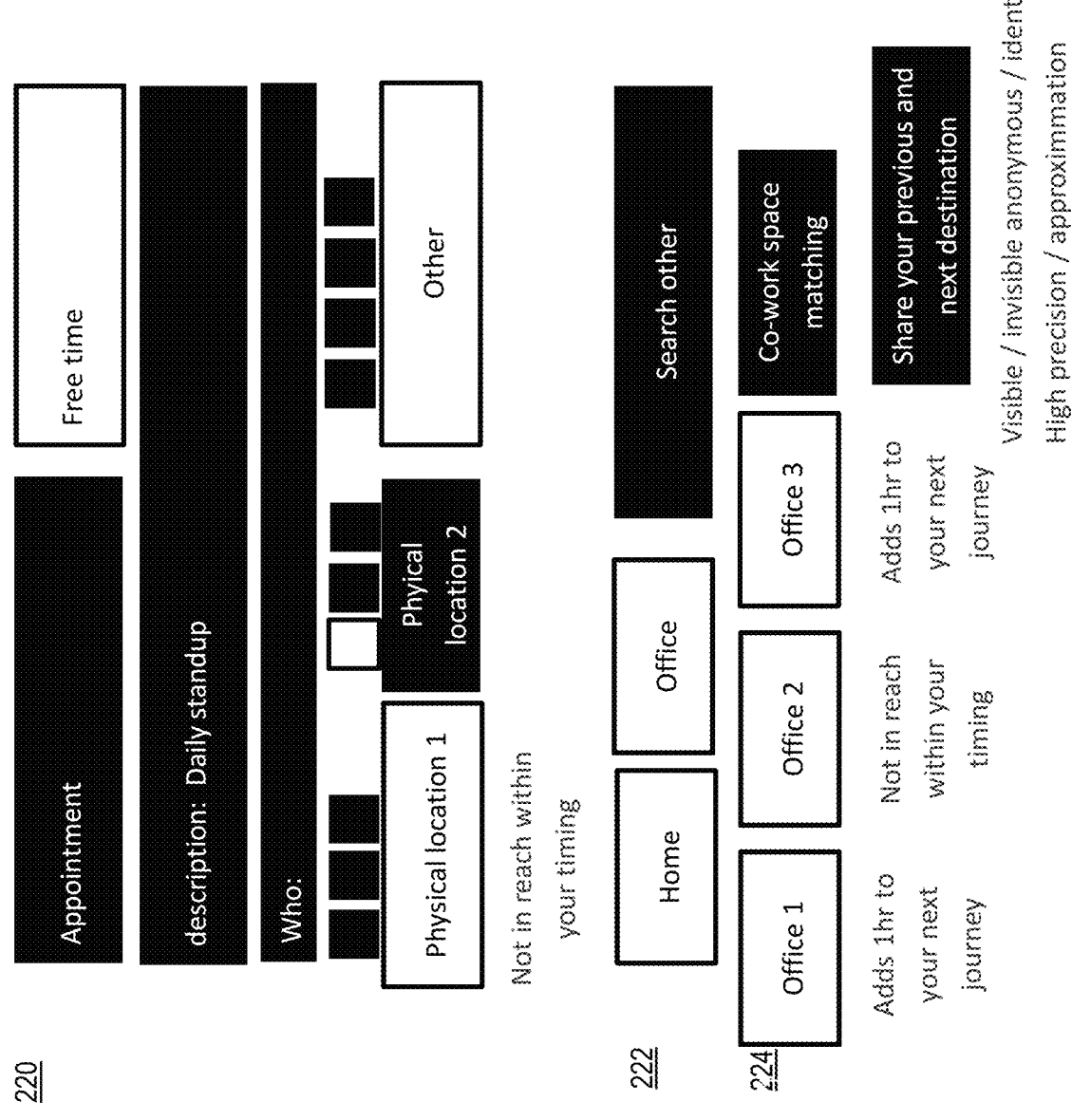

In FIG. 2C, the system 100 can show a user interface or diagram 220 for the appointment 215 with a description of "daily standup" and options of "participation location 1 (not in reach within your timing)", "physical location 2", and "other participation locations". In response to a user selection of the option of "physical location 2", the system 100 can show a user interface or diagram 222 with a query of "where would you like to go" and options of "home", "office" and "search other". In response to a user selection of the option of "office", the system 100 can show a user interface or diagram 224 with office options of "office 1 (add 1 hr. to your next journey)", "office 2 (not in reach within your timing)", "office 3 (add 1 hr. to your next journey)", and "co-work space matching."

Although various embodiments are described with respect to walking, it is contemplated that the approach described herein may be used with other modes of transport, and transfers among different modes of transport, and the system 100 can handle any numbers of such modes of transport and/or transfers towards a flexible meeting location.

In response to a user selection of the option of "co-work space matching," the system 100 can prompt the requesting participant to set one or more co-work space search criteria, for example, within a 200-meter radius from a transportation hub. Once Utrech Central Station is determined, the system 100 shows an option of "share you previous and next destinations" to share the co-work space (e.g., Utrech Central Station) for the daily standup meeting appointment 215 and/or other meeting information with one or more other participants. Under the option of "share you previous and next destinations," the system 100 can further shows meeting destination sharing granularity settings of "visible/invisible," "anonymous/identified," "high precision/approximation."

Once Utrech Central Station is determined, the system 100 can also show a user interface or diagram 226 in FIG. 2D with its available meeting resources of "reserve parking", "reserve charging," "reserve coworking space," "reserve private room," and "coffee/lunch" at the destination: a co-work space X in the Utrech Central Station. The system 100 can then show a user interface of diagram 228 with a query of "how would you like to go," transport types of "individual/private", "hybrid" and "public," feasible modes of transport, and an option of "customize and book your journey". The diagram 228 shows feasible modes of transport of "drive oneself," "car-sharing," "autonomous vehicle," "train+walk," and "train+bus+walk" and their respective cost and conditions. For example, the "self-driven" option to the Utrech Central Station will take a total time (TT) of 16 minutes, costs 9 euros, and the parking is challenging here. As another example, the "driven/taxi" option to the Utrech Central Station will take a total time of 14 minutes and costs 17 euros. The "full autonomy" option to the Utrech Central Station is not available in this region. As another example, the "train+walk" option to the Utrech Central Station will take a total time of 45 minutes, costs 10.80 euros in a high occupancy train, and walking 3000 steps. As another example, the "train+bus+walk" option to the Utrech Central Station will take a total time of 20 minutes, costs 13.80 euros, via a direct bus, and walking 300 steps.

In other embodiments, the system 100 can consider other meeting resources than those reservable at the flexible meeting location in the diagram 226, such as some light equipment carried by participants and/or by an autonomous robot to support whiteboard and/or content projection as identified by the system 100, or any plane vertical surface on which a light projector could show some content (e.g., PPT or other). Such plane vertical surface can be scanned and reported (map mining) by participant(s) to a geographic database, for example, using a Lidar scanner on the phone.

In response to a user selection of the option of "train+bus+walk," the system 100 calculates and shows the map view 213 in FIG. 2B. The map view 213 shows participant A will be at a co-work space X in the Utrech Central Station for the daily standup appointment 215, while co-workers E-F at their current locations at 7:00 am will travel to their estimate locations E'-F' to be within a radius or an isoline from the co-work space X to catch the daily standup appointment 215. On the other hand, co-worker G at his or her current location at 7:00 am will travel to an estimate location G' to be out of the radius or the isoline from the co-work space X so as to miss the daily standup appointment 215. In another embodiment, participant A can choose to meet co-workers E-F at a private location P1 at an earlier time before they move to the estimate locations E'-F'.

Since the editorial board appointment 217 during 11:00-noon has a fix location Beethovenlaan 500 Amsterdam, the system 100 moves to determine the flexible meeting location and time for the ad hoc lunch appointment 219.

In one embodiment, the system 100 can suggest a list of ad-hoc/spontaneous candidates for a walk based on their locations, availabilities, preferences, etc. By way of example, participant A has one hour for a walk now, the system 100 can determine who among the people participant A needs to meet will be available for such walk. The system 100 can rank the list of candidates based on the real-time information available. For instance, participant E is a 95% match as he is nearby, has 1.5 hours free in his calendar now, and participant A has some urgent topics to discuss with him.

Figure 2E:
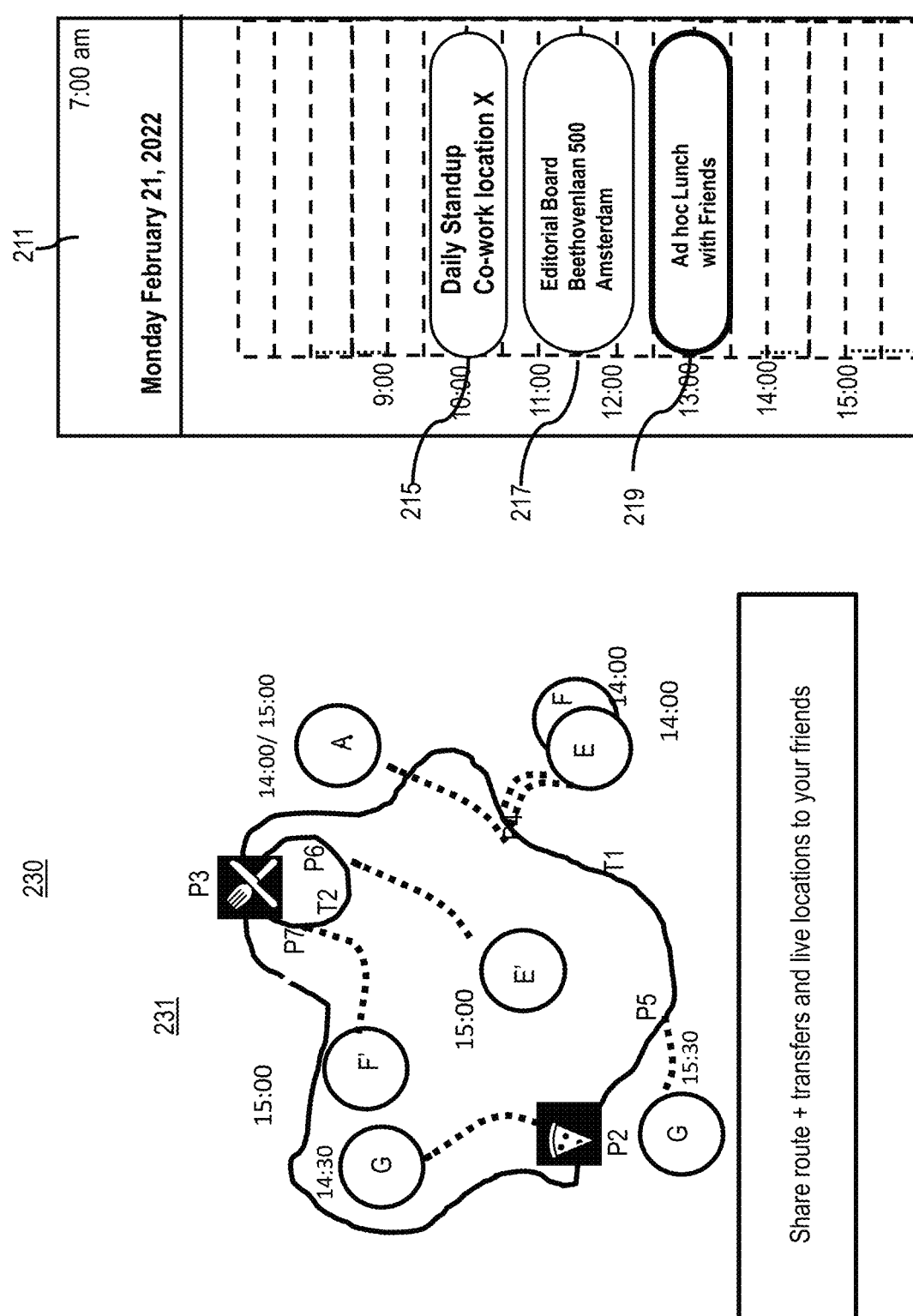

FIG. 2E depicts in a user interface 230 that include the calendar view 211 of the same three participant A's appointments on the right on Monday Feb. 21, 2022, and a map view 231 of potential flexible meeting locations with other participants for the ad hoc lunch appointment 219. In FIG. 2E, the calendar view 211 highlights the appointment 219 of the ad hoc lunch with friends from 13:00. The process of determining the flexible meeting location of the ad hoc lunch appointment 219 will be described in conjunction with FIGS. 2F-2G.

Figure 2F:
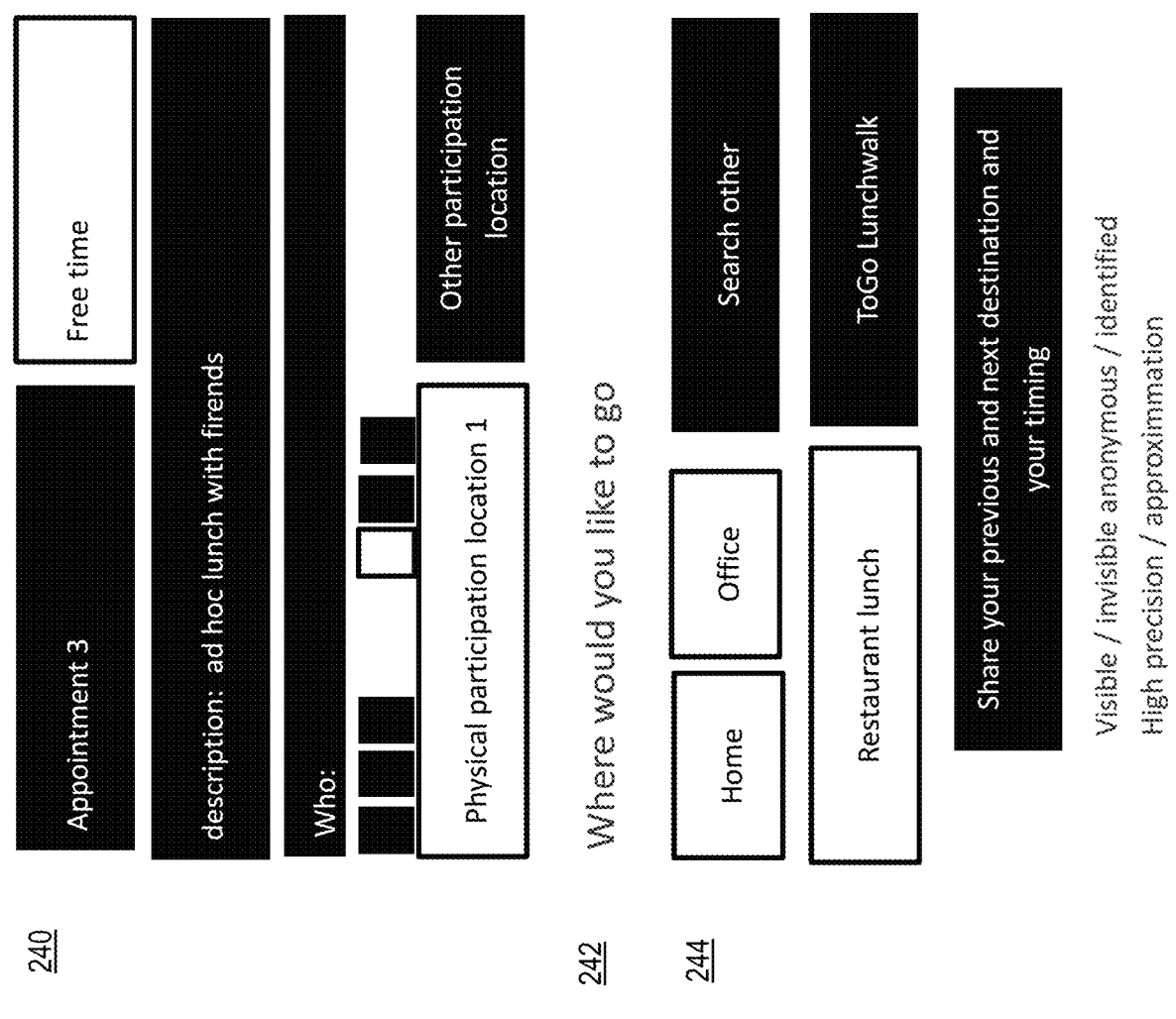

In FIG. 2F, the system 100 can show a user interface or diagram 240 for the appointment 219 with a description of "ad hoc lunch with friends" and options of "physical participation location 1", and "other participation location". In response to a user selection of the option of "other participation location", the system 100 can show a user interface or diagram 242 with a query of "where would you like to go" and options of "home", "office" and "search other". In response to a user selection of the option of "search other", the system 100 can show a user interface or diagram 244 with options of "restaurant lunch", and "ToGo Lunchwalk."

Figure 2G:
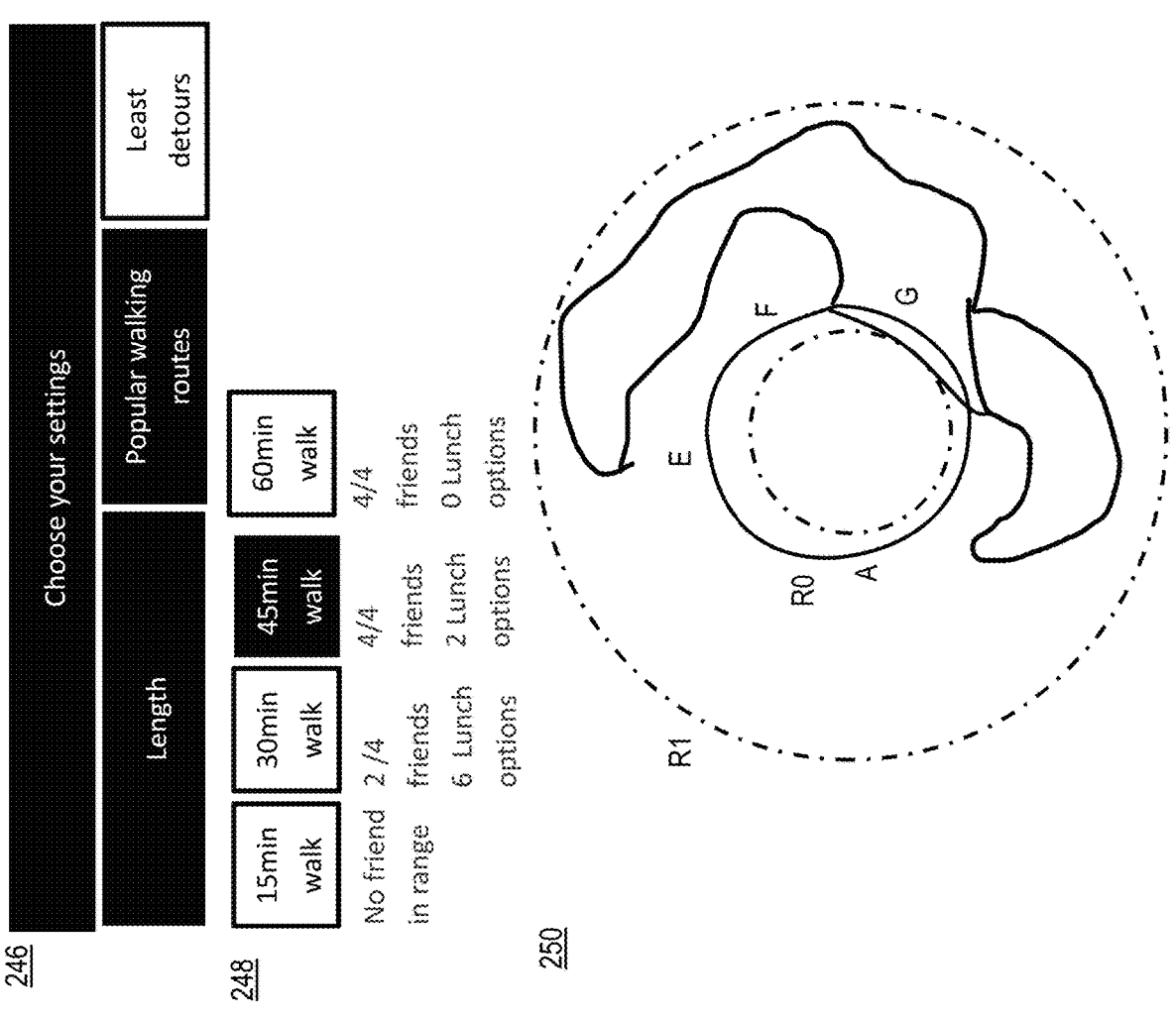

In response to a user selection of the option of "ToGo Lunchwalk," the system 100 can show a user interface of diagram 246 in FIG. 2G with a query of "choose your settings," lunch-walk settings of "length", "popular walk routes" and "least detours." In response to user selections of the options of "length" and "popular walk routes", the system 100 calculates and shows a user interface of diagram 248 with four options: "15 min walk: No friend in range," "30 min walk: 2/4 friends & 6 lunch options," "45 min walk: 4/4 friends & 2 lunch options," and "60 min walk: 4/4 friends & 0 lunch option."

In response to a user selection of the option of "45 min walk: 4/4 friends & 2 lunch options," the system 100 calculates and shows the map view 231 in FIG. 2E. The map view 231 shows two ToGo lunch options at P2 (e.g., a pizza place) and P3 (e.g., a cafe). For meeting at P2, participants A, E, F can start walking from their estimated locations at 14:00 pm to meet at location P4 on a trail T1, then walking together clockwise to P2. Participant G is closer to P2, and can start walking from an estimated location at 14:30 pm to P2 and meet participants A, E, F for lunch.

For meeting at P3, participant A can start walking from an estimated locations at 15:00 pm to get to location P4 on the trail T1, then walking alone counterclockwise to P3. Participant G is farthest to P3, however, can start from an estimated location at 15:30 pm using a faster mode of transport (e.g., bike) to get on the trail T1 at a location P5, then traveling counterclockwise to meet participants A, E, F for lunch at P3.

Participants E, F can start walking alone respectively from their estimated locations at 15:00 pm to get on a trail T2 at locations P6, P7, then walking towards P3 respectively along the trail T2. For instance, participants E, F can walk towards each other on T2, then walking together along T2 clockwise or counterclockwise to P3. As another instance, participants E, F can each take the shortest route towards P3 without meeting on T2 until reaching P3. As another instance, participants E, F can walk at the same direction on T2 to reach P3 at different time points. As another instance, at least one of the participants E, F travel on T2 for over one loop use a faster mode of transport (e.g., jogging) and still timely meet the other participants for lunch at P3. As such, the system 10 can organize walking meetings outdoors with a candidate list of participants (e.g., participants E, F, G) that participant A wants to meet, based on their availability, locations, preferences, etc.

After the requesting participant selects the ToGo lunch option P2 or P3, the system 100 can show a query of "share you previous and next destinations" in the user interface or diagram 244, in order to share the selected ToGo lunch option and trail for the ad hoc lunch appointment 219 and/or other meeting information with one or more other participants. Under the option of "share you previous and next destinations," the system 100 can further shows meeting destination sharing granularity settings of "visible/invisible," "anonymous/identified," "high precision/approximation."

In other embodiments, the system 100 can plan the trails T1, T2 in one or more nearby "green" areas (e.g., a park, forest, etc.), while optimizing for time, privacy, weather, noise, etc. For example, a privacy parameter can be based on data from population density, traffic on road segments, etc. As another example, a noise parameter can be based on noise sensor data captured from outdoors sensors, phones, watches, etc. Referring back to FIG. 2G, the system 100 can prompt the requesting participant A to set one or more green walking trail search criteria, for example, between inner and outer boundaries from a town center as shown in a user interface or diagram 250. For instance, the inner and outer boundaries can be an R0 radius and an R1 radius from the town center. As another instance, the inner and outer boundaries can be 3-hr and 5-hr walking isolines from the town center. The system 100 can then generate the navigation routes for the participants as discussed. For instance, the system 100 can send individual routes to the respective participants from their current locations to respective meeting place(s), such as P2, P3, P4, etc. in FIG. 2E. As another instance, the system 100 can set alerts for the participants to start a journey towards the meeting place(s) along the navigation route (e.g., T1 or T2) of the requesting participant A.

In other embodiments, the system 100 can choose different routes/paths for a participant to make subsequent trips more interesting by avoiding passing many times on same paths when possible.

In one embodiment, the system 100 can consider context of each meeting, such as two or more participants, topic, additional details, etc., when choosing the flexible meeting location(s), routes to the flexible meeting location(s), etc. The system 100 can keep some of the context (e.g., a marriage proposal) private to the requesting participant (e.g., participant A).

In another embodiment, the system 100 can adapt a proposed route to the topic(s) of the meeting, for example, as entered by the requesting participant from a choice selection. For instance, for a meeting with good news, the system 100 prefers to be mostly in the forest, while for a meeting with some "constructive feedback", the system 100 prefers passing near a lake which view may soften the message. The system 100 can choose topic-oriented routes in a non-predictable way by using an algorithm to avoid a participant from guessing that "we are taking the path to the lake so the requesting participant may have bad news for me."

In one embodiment, the system 100 can offer a "light guidance mode" so that a participant can know when to turn without paying much attention to the guidance itself and get distracted from the ongoing discussion with other participant(s). For instance, the "light guidance mode" can provide subtle notification on a watch that a participant does not need to look at, an augmented reality (AR) glasses, a drone visible on the horizon showing the way, etc.

In one embodiment, all the flexible meeting locations and times are determined concurrently to provide the navigation routes for the participant A and the other participants before participant A starts the navigation. In another embodiment, some of the flexible meeting locations and times are determined on the go, to update the navigation routes for the participant A and the other participants when participant A is traveling on the navigation route. For instance, participant A spontaneously can cancel the ad hoc lunch appointment 219 due to unforeseeable circumstances (e.g., delay caused by the editorial board appointment 217 delay, weather, traffic, participant A twists an ankle, etc.), or add a fourth appointment to meet friends for playing location-based video game (e.g., Pokémon-Go) after finishing the editorial board appointment 217. In either case, the system 100 can re-calculate the optimal route as discussed based on the remaining appointments and updated circumstances, and inform the remaining participant(s) any meeting changes (e.g., locations, time, etc.).

Once participant A selects one of the ToGo lunch options at P2 (e.g., a pizza place) and P3 (e.g., a cafe), the system 100 can show an option of "share route+transfers and live locations to your friends" under the map view 231 in FIG. 2E. As such, all the participants A, E, F, G can see the progress of one another to meet at the selected ToGo lunch location.

The consideration of multiple modes of transport, multiple participants meeting at one flexible meeting location, timing and other constrains, etc. increases routing complexity. The system 100 can apply machine learning to provide a navigation route for a requesting entity to meet other entities at flexible meeting locations as later explained.

In another embodiment, the system 100 can use blockchains for secure navigation route and meeting data access. The blockchain is configured to propagate one or more branching blockchains, and the branching blockchains is configured to propagate one or more additional branching blockchains. In general terms, a blockchain is an immutable cryptographically linked list of data blocks called a ledger and maintained within a distributed peer-to-peer framework such as a consortium network with nodes. These nodes, for instance, each maintains an identical copy of the ledger by appending transactions that have been validated by a consensus protocol, grouped into blocks. Each block generally contains a cryptographic hash of previous block, a timestamp and transaction data (e.g., generally represented as a Merkle tree). All blocks that are added to the blockchain are unalterable and changing any of them retroactively would require alteration of all subsequent blocks which in turn requires consensus of network majority.

In one embodiment, UEs 101 of participants and sensors in modes of transport 103a-103n (also collectively referred to as modes of transport 103) are collecting and reporting data (e.g., location data, contextual data, meeting resource data, etc.) to the system 100 to support the generation of a navigation route for a requesting entity to meet other entities at flexible meeting locations via available modes of transport 103 according to the embodiments described herein. In addition, the system 100 can support the entities to locate and/or reserve modes of transport 103, meeting resources, etc. The contextual data (e.g., meeting delay, traffic, weather conditions, etc.) can be used to dynamically update the navigation route, flexible meeting locations, and/or relocation and/or reservations of modes of transport 103, meeting resources, etc.

In this way, the participants can use the system 100 for receiving navigation route information as well as navigation instructions to reach flexible meeting locations. The system 100 can use contextual data (e.g., traffic, weather conditions, etc.) to dynamically update the navigation route, flexible meeting locations, and/or relocation and/or reservations of modes of transport 103, meeting resources, etc. thereby optimizing the amount of cost, time, distance, etc. of the meetings. In one embodiment, the UEs 101 and a routing platform 105 of the system 100 have connectivity via a communication network 107.

In one embodiment, the modes of transport 103 are equipped with a device (e.g., the UE 101 or other accessory device) to record their trajectory data (e.g., position, speed, etc.). In one embodiment, the UE 101 may be configured with one or more sensors 109a-109n (also collectively referred to as sensors 109) for determining the trajectory data (including stopping or parking locations). By way of example, the sensors 109 may include location sensors (e.g., GPS), accelerometers, compass sensors, gyroscopes, altimeters, etc.

In one embodiment, after a journey or the trajectory data is recorded (e.g., upon stopping/parking), the trajectory data is analyzed (e.g., by respective applications 111a-111n and/or the routing platform 105 for storage in, for instance, a transportation database 113 and/or a geographic database 115) to determine actual meeting locations. Applications 111a-11 In (also collectively referred to as applications 111)

preform navigation and/or routing functions independently or in conjunction with the routing platform 105. In one embodiment, the routing platform 105 and/or applications 111 receive a user request to compute a navigation route and make reservations of modes of transport, meeting resources, etc. for participants.

In another embodiment, the system 100 detects a participant travel pattern/habit and/or mobility graph via machine learning algorithms and predicts that the participant requires a mode of transport reservation.

In one embodiment, timestamp information indicates at which time and which location the mode of transport was parked/stopped is recorded as a record in the transportation database 113. In one embodiment, the record is then transmitted or uploaded to the routing platform 105. In addition or alternatively, the raw trajectory data may be uploaded to the routing platform 105 to determine the record. In yet another embodiment, the record and/or trajectory data may be maintained at the UE 101 device for local processing to determine mode of transport parking/stopping information for transmission to the routing platform 105 and/or other modes of transport/UEs 101 (e.g., when operating in a peer-to-peer network architecture), thereby presenting participants' real-time locations in the user interfaces of the UE 101 of the participants (e.g., FIG. 2B, FIG. 2E).

The mode of transport may include walking, jogging, cycling, motorbiking, taking one or more taxis, taking one or more buses, taking one or more trains, taking one or more subways, taking one or more ferries, taking one or more shared vehicles, etc.

In another embodiment, the routing platform 105 may present to the requesting participant information on points of interest (POIs), parking areas, road segments, and/or related information retrieved from the geographic database 115, as candidate flexible meeting locations, a part of the navigation route, etc. In addition or alternatively, such information can be provided by the service platform 117, one or more services 119a-119m (also collectively referred to as services 119), one or more content providers 121a-121k (also collectively referred to as content providers 121), or a combination thereof. For example, the sources of the information may include map data, information inferred from data collected from participating modes of transport, etc.

In one embodiment, apart from an optimal or recommended candidate flexible meeting locations, a navigation route, etc., the routing platform 105 may also update the information as a map overlay that illustrates, for instance, timestamps, a number of available modes of transport, traffic, etc. around a current location of the UE 101, a flexible meeting location, etc. based on real-time transport data from the transportation database 113.

Therefore, the system 100 can present a navigation route with flexible meeting locations for a requesting participant, other routes for the other participants to meet the requesting participant, and provide each participant with the navigation directions on the participant's own mobile device.

The system 100 can recommend and execute reservations of modes of transport, meeting resources, etc. for the flexible meetings scheduled for the requesting participant to meet the other participants.

The system 100 can real-time monitor the participant travel status (e.g., predictive and live delays) of the participants and adjust the flexible meeting locations, the navigation route, the reservations of modes of transport, meeting resources, etc. considering the travel status.

The system 100 enables new meeting experiences using isoline routing with dynamic adjustment capabilities. The complexity of the isoline routing and meeting adjustment can be made simple by being automated, extended when needed, all in the background and taking into account the participant context and/or constraints (e.g., meeting time and length availability), availability of the modes of transport, etc.

The system 100 can combine different technologies (isoline routing, probability computation, multimodal routing, machine learning, meeting resource sensing, predictive parking, etc.) to provide a platform for participants to meet ad hoc and share their travel status via combining many types of data sets, thereby determining candidate flexible meeting locations and facilitating such flexible meetings.

Figure 3:
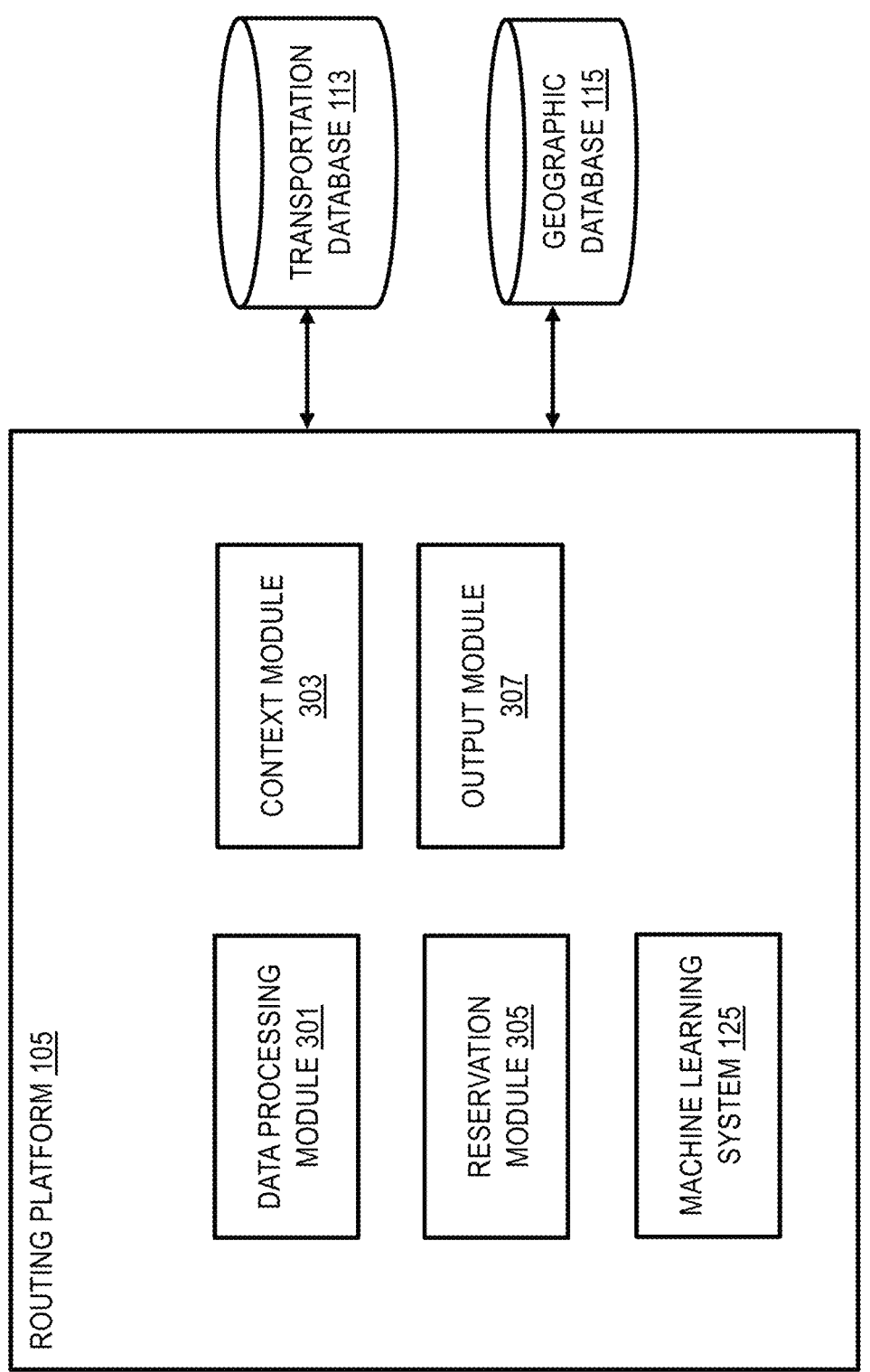
FIG. 3 is a diagram of the components of a routing platform, according to one embodiment.

FIG. 3 is a diagram of a routing platform capable of providing a navigation route for a requesting entity to meet other entities at flexible meeting locations, according to one embodiment. In one embodiment, the routing platform 105 and/or an application 111 (e.g., in a UE 101) may perform one or more functions or processes associated with providing a navigation route for a requesting entity to meet other entities at flexible meeting locations. By way of example, as shown in FIG. 3, the routing platform 105 and/or the application 111 including one or more components for performing functions or processes of the various embodiments described herein. It is contemplated that the functions of these components may be combined or performed by other components of equivalent functionality. In one embodiment, the routing platform 105 and/or the application 111 include a data processing module 301, a context module 303, a reservation module 305, an output module 307, and a machine learning system 125 and has connectivity to the transportation database 113 and the geographic database 115. The above presented modules and components of the routing platform 105, the application 111, and/or the machine learning system 125 can be implemented in hardware, firmware, software, or a combination thereof. In one embodiment, the routing platform 105, the application 111, the machine learning system 125, and/or any of their modules 301-307 may be implemented as a cloud-based service, local service, native application, or combination thereof. The functions of the routing platform 105, the application 111, the machine learning system 125, and modules 301-307 are discussed with respect to FIGS. 4-5 below.

Figure 8:
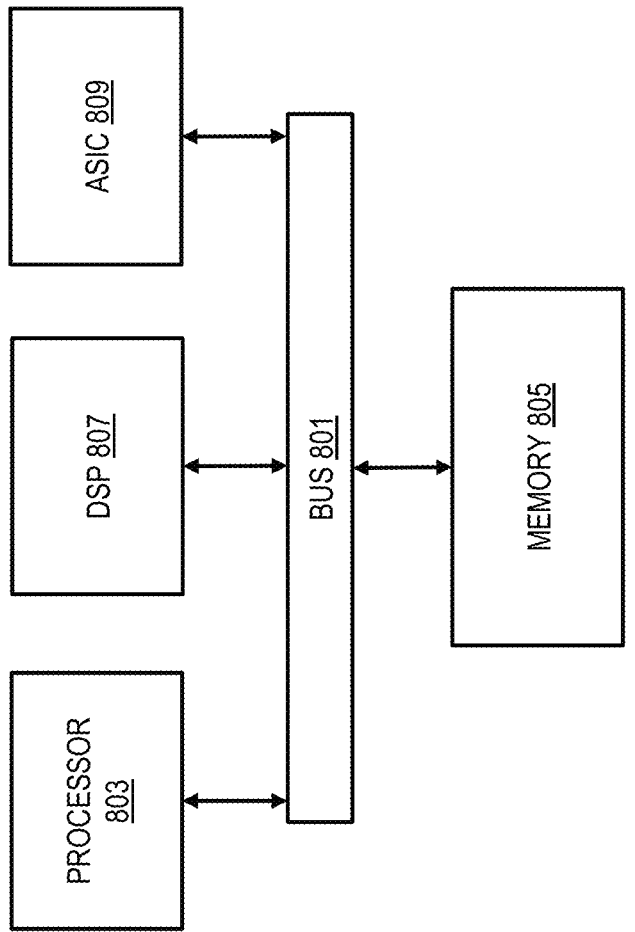
FIG. 8 is a diagram of a chip set that can be used to implement an embodiment of the invention.

FIG. 4 is a flowchart of a process for providing a navigation route for a requesting entity to meet other entities at flexible meeting locations, according to one embodiment. In various embodiments, the routing platform 105, the application 111, and/or any of their modules 301-307 may perform one or more portions of the process 400 and may be implemented in, for instance, a chip set including a processor and a memory as shown in FIG. 8. As such, the routing platform 105, the application 111, and/or any of their modules 301-307 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all the illustrated steps.

In one embodiment, for example, in step 401, the data processing module 301 can receive a request to generate a navigation route (e.g., the route 207, the routes 209, or their combination in FIG. 2A) to visit a plurality of entities (e.g., one or more participants in FIG. 2A, one or more drones, one or more autonomous vehicles, etc.), while one or more mobile entities of the plurality of entities are capable of moving from a current location (e.g., locations 201, 203a-203d, etc.) during the navigation route. For instance, the navigation route can comprise a sequence of respective meeting locations (e.g., locations 207a-207d in FIG. 2A) for each entity to meet a requesting entity associated with the request at respective meeting locations along the navigation route. In one embodiment, the data processing module 301 can select the plurality of entities based on a time available to complete the navigation route that is specified in the request (e.g., 10:00 am for the daily standup meeting in FIG. 2A), and the respective meeting locations can be selected within one or more areas located between the navigation route, the isolines, or a convex hull connecting the current location of each entity (e.g., POIs within the gray areas in FIG. 2A).

In one embodiment, in step 403, the data processing module 301 can compute respective isolines (isolines 205 in FIG. 2A) around each mobile entity based on a travel distance (e.g., a maximum walking distance of 800 meters), a travel time e.g., a maximum jogging time of 5 minutes), or a combination thereof that each mobile entity is ready to travel from the current location of each mobile entity during the navigation route. For instance, the navigation route further comprises respective meeting times for each entity based on an estimated time of arrival at each of the respective meeting locations by the requesting entity (e.g., 13:00 am for the ad hoc lunchwalk meeting in FIG. 2A).

In one embodiment, in step 405, the data processing module 301 can connect at least the respective isolines around each mobile entity to determine the navigation route (e.g., connecting the stating location 201 and the flexible meeting locations 207a-207d in FIG. 2A). For instance, the connecting of the respective isolines (e.g., isolines 205a-205d in FIG. 2A) comprises generating a polygon (e.g., a convex hull) that connects the respective isolines with a starting point (e.g., the stating location 201) of the navigation route. For instance, the navigation route can be further determined based on minimizing a travel distance, a travel time, or a combination thereof for each entity. In another embodiment, the data processing module 301 can optimize the navigation route based on a total cost for completing the navigation route and other routes for all of the participants. As another instance, the data processing module 301 can optimize a cost function including parameter such as distance, fuel efficiency, estimated time of arrival (ETA), a quality of flexible meeting location(s), etc. in combination with various modes of transport available for the participants. As other instances, the data processing module 301 can optimize the navigation route based on at least one of scenery, time, privacy, weather, noise, traffic, or a combination thereof along the routes and/or at the flexible meeting locations.

In another embodiment, the data processing module 301 can monitor a progress of the requesting entity (e.g., the requesting participant A in FIG. 5B) moving along the navigation route (e.g., the route 207), and recompute the navigation route, the respective meeting locations, the respective meeting times, or a combination thereof based on determining that the progress indicates a delay (e.g., a delay of the editorial board meeting) above a threshold value, and then coordinate with the output module 307 to transmit the recomputed route, the recomputed meeting locations, the recomputed meeting times, or a combination thereof to the requesting entity (e.g., the requesting participant A in FIG. 5B), one or more of the plurality of entities (e.g., the remaining participants D, E in FIG. 5B), or a combination thereof. For example, the delays caused by predictive and/or live meetings, traffic, weather, etc.

In another embodiment, the context module 303 can determine a context associated with visiting each entity (e.g., a number of participants, topic, purpose, etc.), and determine the respective meeting locations, the respective meeting times, or a combination thereof based on the context. For instance, for a meeting with good news, the context module 303 can determine a walk mostly in the forest, while for a meeting with some bad news (e.g., salary reduction), the context module 303 can route the walk near a lake which good views to soften the message.

For example, the data context module 303 can recommend points of interest (e.g., the café, the pizza place in FIG. 2E) as the flexible meeting locations associated with the context (e.g., a lunch walk with friends) in connection with the meetings. For instance, referring back to FIG. 2A, rather than using the vertices 207a-207d of the polygon (i.e., the requesting participant navigation route 207) as the flexible meeting locations, the system 100 can search for a POI located within a corridor between the route 208 and the polygon for a flexible meeting location. As another instance, the system 100 can search for a POI located within an area (e.g., in gray) between the route 208 and the isolines 205 for a flexible meeting location. These areas in gray have the advantage of being convenient to both participants while limiting the search to speeding up search time.

In addition, the POI and meeting context information may be stored to the geographic databases 115 for enabling continual learning and refining of the determination capacity of the routing platform 105.

Other contextual information may be used to further filter and/or refine an initial set of candidate flexible meeting locations for a requesting participant. For instance, the context module 303 may retrieve and/or derive user profile data, user context data (e.g., available modes of transport, preferences, etc.), contextual information associated with candidate flexible meeting locations for the data processing module 301 to determine flexible meeting location(s). Hence, an initial set of candidate flexible meeting locations may be refined into one or more flexible meeting locations. For the purpose of illustration, the flexible meeting location contextual information may include parking information, traffic information, traffic light information, public transport schedule information, modes of transport availability information, environmental condition information, obstruction information, or a combination thereof. The user context data may include a number of participants to meet at one location, physical capability information of the participant, load/luggage information, etc. For example, such context information can be acquired by way of the services 119 including location based services and navigation services, sensors of the UE 101 and/or mode(s) of transport, data compiled per databases 113, 115, etc.

In one embodiment, the context module 303 can retrieve modes of transport data from various sources such as the transportation database 113, transit agencies, public transportation operators, shared vehicle operators, etc. In one embodiment, the context module 303 aggregates schedules of various modes of transport 103. In another embodiment, the context module 303 can analyze trajectory data (including associated timestamps) uploaded by one or more UE 101 and/or various modes of transport 103 to determine the status of the modes of transport.

In one embodiment, the context module 303 may also operate in connection with the application 111 to determine the geographic or temporal context or situation of a UE 101.

This includes receiving relevant information from the various sensors 109 of the UE 101 for determining meeting progress, navigation route progress, user or environmental conditions, and/or utilizing location-based data to determine current location (e.g., geographic coordinates) and temporal information (e.g., speed) regarding a UE 101. The context module 303 may also retrieve or identify whether certain conditions or triggers have been met, such as whether a particular event has occurred, such as whether a reserved mode of transport has reached a participant.

For instance, the context module 303 can determine a meeting resource (e.g., equipment, parking, room, etc.) to be used at the respective meeting locations, and initiate the reservation module 305 to make at least one of: a reservation of the meeting resource based on the respective meeting locations, the respective meeting times, or a combination thereof; a delivery of the meeting resource based on the respective meeting locations, the respective meeting times, or a combination thereof; and a creation of a list of the meeting resource.

In one embodiment, the machine learning system 125 can build a machine learning model for the navigation route planning process by selecting respective factors such as participant location data, meeting context (e.g., daily standup, lunch walk, etc.), participant context (e.g., contact data, calendar data, mobility capability, mobility patterns, available modes of transport, loads, etc.), road/trail topology, traffic patterns, etc., to determine flexible meeting locations on a navigation route of a requesting participant. In one embodiment, the machine learning system 125 can select or assign respective weights, correlations, relationships, etc. among the factors, to optimize the navigation route for one or more of the participants. In one instance, the machine learning system 125 can continuously provide and/or update the machine learning model (e.g., a support vector machine (SVM), neural network, decision tree, etc.) during training using, for instance, supervised deep convolution networks or equivalents. In other words, the machine learning system 125 trains the machine learning model using the respective weights of the factors to most efficiently select flexible meeting locations for the navigation route under different context/scenarios.

In another embodiment, the machine learning system 125 includes a neural network or other machine learning system to compare (e.g., iteratively) participant paths features (e.g., using distance/width/length thresholds, offsets, etc.) to detect delay incidents (e.g., a meeting delay) during a navigation route, thereby updating the navigation route and/or associated meeting resource reservations based on the delay. In one embodiment, the neural network of the machine learning system 125 is a traditional convolutional neural network which consists of multiple layers of collections of one or more neurons (which are configured to process a portion of an input data). In one embodiment, the machine learning system 125 also has connectivity or access over the communication network 107 to the transportation database 113 and/or the geographic database 115 that can each store flexible meeting data, meeting resource reservation data, etc.

In one embodiment, the machine learning system 125 can improve the navigation route planning process using feedback loops based on, for example, participant behavior and/or feedback data. In one embodiment, the machine learning system 125 can improve the machine learning model for the navigation route planning process using participant behavior and/or feedback data as training data. For example, the machine learning system 125 can analyze correctly identified traffic incent data, missed traffic incident data, etc. to determine the performance of the machine learning model.

Figure 5A:
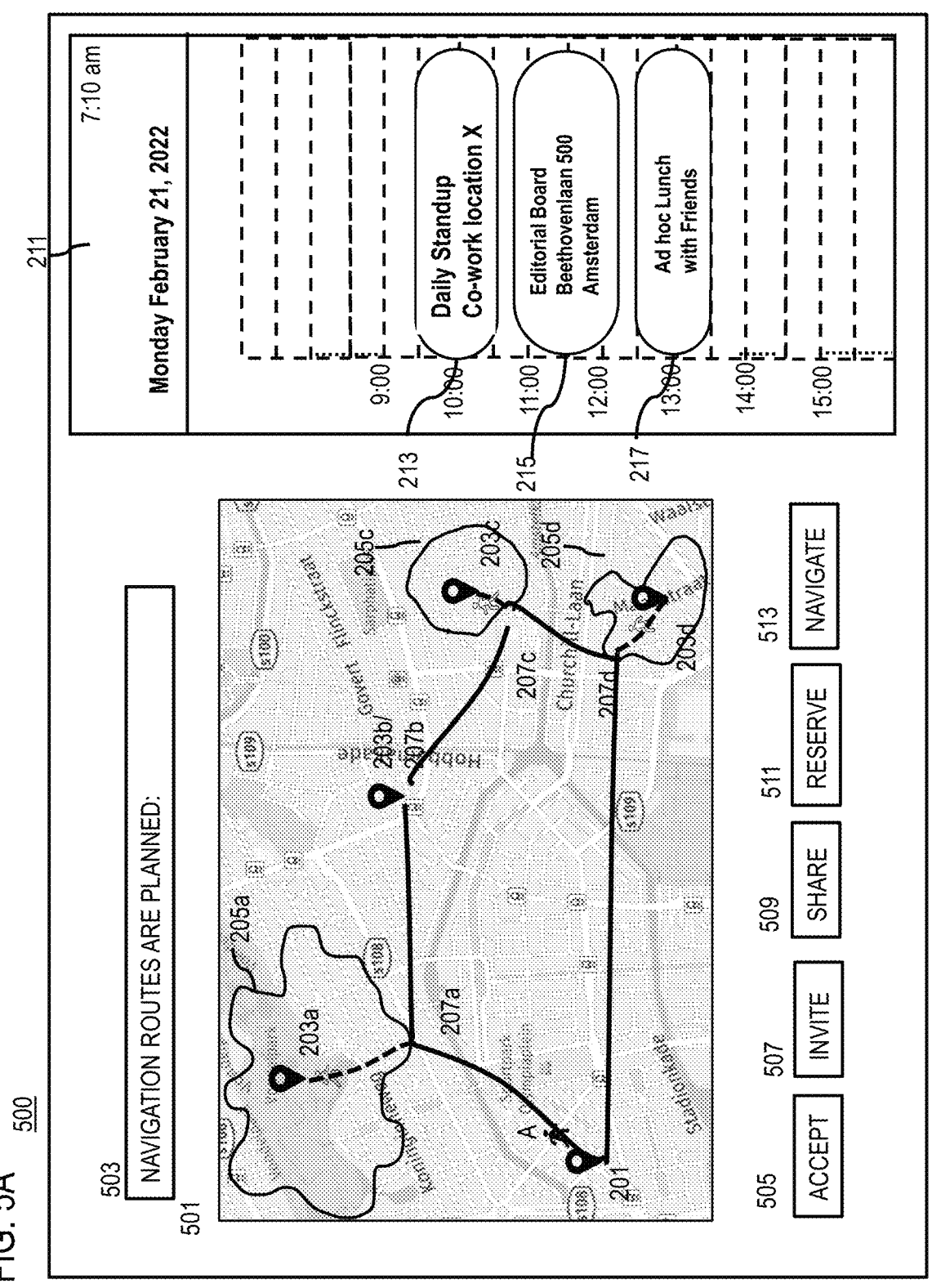
FIGS. 5A-5B are diagrams of user interfaces showing a navigation route connecting flexible meeting locations, according to various embodiments.

In one embodiment, in step 407, the output module 307 can provide the navigation route (e.g., the route 207, the routes 209, or their combination in FIG. 2A) as an output (e.g., FIG. 5A). For instance, once the navigation route is determined, the data processing module 301 can interact with the output module 307 to present to the requesting participant the navigation route. For instance, after the requesting participant selects the navigation route, the data processing module 301 can interact with the output module 307 to present to the participants flexible meeting locations, available modes of transport and timing information, related navigation instructions, and/or other information related to the meetings. For instance, the requesting participant A can selectively share his or her navigation route, meeting topics/purposes, etc. with one or more of the other participants B-E base on privacy concerns.

By way of example, the navigation route can be a walking route, and the plurality of entities includes a plurality of people that a requesting entity of the navigation route wants to meet. In other examples, the entities can use walking, jogging, a public transport, a private vehicle, a shared vehicle, an autonomous vehicle, a taxi, a ride-hailing service, or a combination thereof.

Figure 5B:
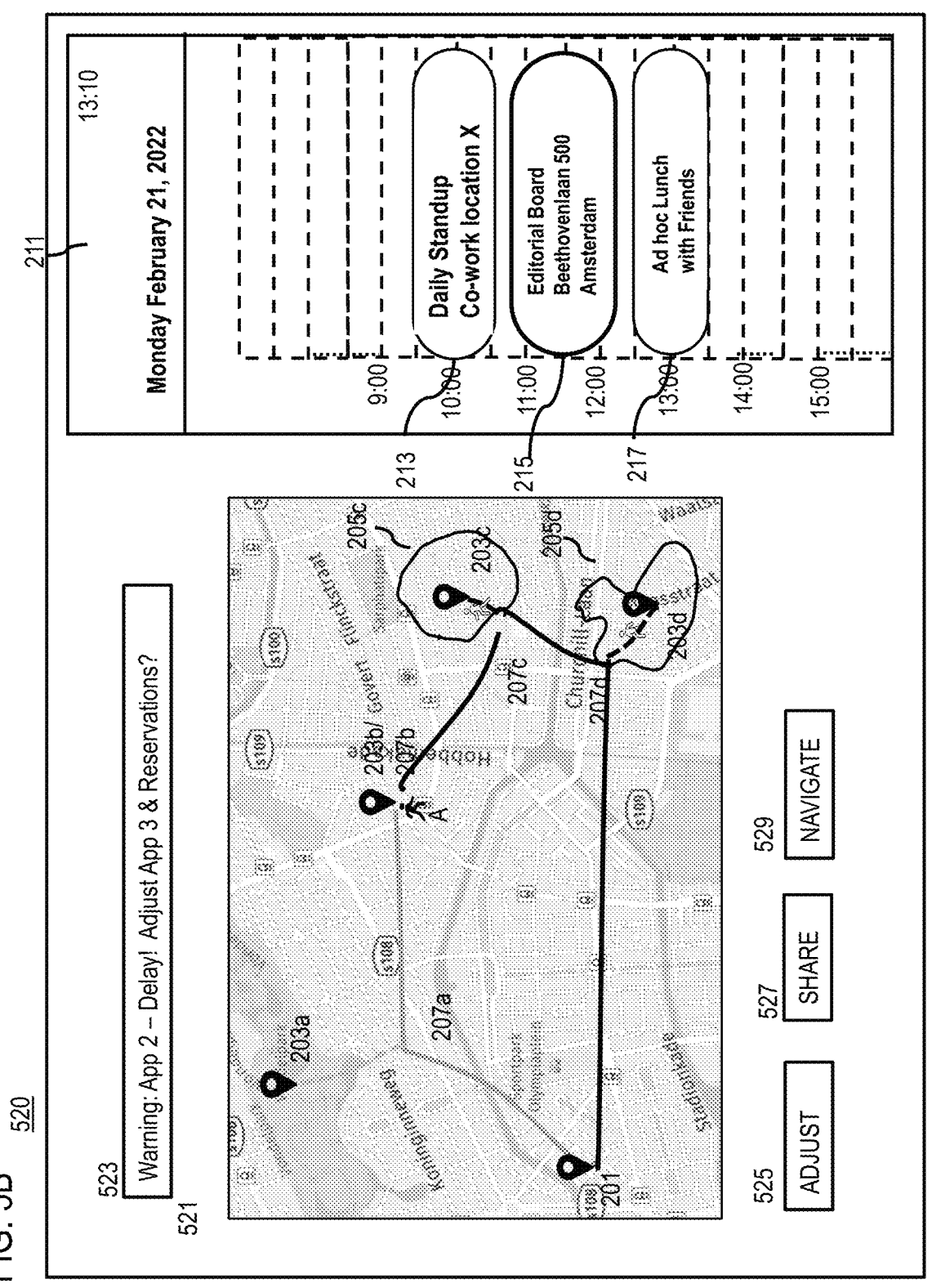

FIGS. 5A-5B are diagrams of user interfaces showing a navigation route connecting flexible meeting locations, according to various embodiments. FIG. 5A is a diagram of an example user interface for applying a navigating route of a requesting participant, according to one embodiment. After such participant navigation routes (e.g., the routes 207, 209 in FIG. 2A) are planned at 7:10 am, a user interface (UI) 500 is generated for a UE 101 (e.g., a mobile device, an embedded navigation system, a client terminal, etc.) of the requesting participant that includes the calendar view 211, a map 501 (superimposed with the current participant locations 201, 203, isolines 205, and the navigation routes 207, 209), as well as an alert 503 of "navigation routes are planned". The user interface 500 also shows an "Accept" button 505, an "Invite" button 507, a "Share" button 509, a "Reserve" button 511, and a "Navigate" button 513.

For example, the requesting participant can select the buttons 505-513 via one or more physical interactions (e.g., a touch, a tap, a gesture, typing, etc.), one or more voice commands (e.g., "accept the navigation routes," "invite other participants," "share the navigation routes with the other participants," "reserve meeting resources," "start navigation," etc.), or other actions by a user (e.g., an eye gaze). For instance, the requesting participant can selectively share the routes, the meeting location and context information, and meeting resource reservation information differently with different participants, such that different participants are shown with different UIs that are similar to UI 500 yet different. The requesting participant can also selectively share the route accepting right and meeting resource reservation right differently with different participants.

When the system 100 detects a delay (e.g., a meeting delay, a traffic delay, etc.) during the navigation routes, a UI 520 is generated for the UE 101 in FIG. 5B, that includes the calendar view 211 with the source of delay highlighted (e.g., the editorial board appointment), a map 521 (superimposed with remaining participant locations 203 and the remaining navigation routes 207, 209), as well as an alert 523 of "Warning: App 2—Delay! Adjust App 3 & Reservations?" The user interface 520 also shows an "Adjust" button 525, a "Share" button 527, and a "Navigate" button 529. In this example, the requesting participant can select the buttons 525-529 via one or more physical interactions (e.g., a touch, a tap, a gesture, typing, etc.), one or more voice commands (e.g., "adjust the navigation routes," "share adjusted navigation routes with the other participants," "Start navigation," etc.), or other forms of commands.

As shown in FIG. 1, the routing platform 105 operates in connection with UEs 101 and modes of transport 103 for providing a navigation route for a requesting entity to meet other entities at flexible meeting locations. By way of example, the UEs 101 may be any mobile computer including, but not limited to, an in-vehicle navigation system, vehicle telemetry device or sensor, a personal navigation device ("PND"), a portable navigation device, a cellular telephone, a mobile phone, a personal digital assistant ("PDA"), a wearable device, a camera, a computer and/or other device that can perform navigation or location based functions, i.e., digital routing and map display. In some embodiments, it is contemplated that mobile computer can refer to a combination of devices such as a cellular telephone that is interfaced with an on-board navigation system of an autonomous vehicle or physically connected to the vehicle for serving as the navigation system. Also, the UEs 101 may be configured to access a communication network 107 by way of any known or still developing communication protocols. Via this communication network 107, the UE 101 may transmit probe data as well as access various network based services for facilitating providing a navigation route for a requesting entity to meet other entities at flexible meeting locations.

Also, the UEs 101 may be configured with applications 111 for interacting with one or more content providers 121, services of the service platform 117, or a combination thereof. Per these services, the applications 111 of the UE 101 may acquire routing instructions, mode of transport information, traffic information, mapping information and other data associated with the current locations of the vehicle and the participants, etc. Hence, the content providers 121 and service platform 117 rely upon the gathering of user, vehicle, and modes of transport trajectory data and routing data for executing the aforementioned services.

The UEs 101 and the modes of transport 103 may be configured with various sensors 109 for acquiring and/or generating trajectory data regarding the user, a vehicle, other vehicles, conditions regarding the driving environment or roadway, etc. For example, sensors 109 may be used as GPS receivers for interacting with one or more satellites 123 to determine and track the current speed, position and location of a user and/or a vehicle travelling along a roadway. In addition, the sensors 109 may gather tilt data (e.g., a degree of incline or decline of the vehicle during travel), motion data, light data, sound data, image data, weather data, temporal data and other data associated with UEs 101 and/or the modes of transport 103 thereof. Still further, the sensors 109 may detect local or transient network and/or wireless signals, such as those transmitted by nearby devices during navigation of a vehicle along a roadway. This may include, for example, network routers configured within a premise (e.g., home or business), another UE 101 or mode of transport 103 or a communicable traffic system (e.g., traffic lights, traffic cameras, traffic signals, digital signage).

In one embodiment, the routing platform 105 aggregates probe data gathered and/or generated by the UEs 101 and/or the modes of transport 103 resulting from the driving of multiple different modes of transport over a road/travel network. The probe data may be aggregated by the routing platform 105 to provide a navigation route for a requesting entity to meet other entities at flexible meeting locations.

By way of example, the routing platform 105 may be implemented as a cloud based service, hosted solution or the like for performing the above described functions. Alternatively, the routing platform 105 may be directly integrated for processing data generated and/or provided by service platform 117, content providers 121, and/or applications 111. Per this integration, the routing platform 105 may perform candidate routes calculation based on user/vehicle trajectory information and/or public transport information.

In one embodiment, modes of transport 103 can be equipped with a navigation device (e.g., a UE 101) that is capable of submitting to the routing platform 105 requests for routing the modes of transport to a flexible meeting location and of guiding of the participant subsequently. In one embodiment, as the vehicle and the participant follow the respective segments, the UE 101 (e.g., via an application 111) and the modes of transport 103 may iterate their locations with timestamps to the routing platform 105 in order to update the travel status in a real-time and/or substantially real-time manner while factoring in delay caused by traffic, weather, etc.

By way of example, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101, the modes of transport 103, the routing platform 105, the service platform 117, and the content providers 121 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, mode of transport information and/or any other information is used or generated by the system 100 with respect to provide a navigation route for a requesting entity to meet other entities at flexible meeting locations based on routing data stored in the transportation database 113 and associated with and/or linked to the geographic database 115. In one embodiment, the routing data can include modes of transport data, traffic data, user profile data, user context data, indexes, etc. In one embodiment, the public transport data can include any public transport data item used by the routing platform 105 including, but not limited to public transport type data, public transport schedule data, public transport route and stop data, real-time public transport trajectory data, etc. retrieved from transit agencies, public transportation operators, etc. In one embodiment, the public transport data can be used in junction with the user profile data, the user context data, and map data from the geographic database 115 for determining a navigation route, generating one or more intermodal route legs for the participants, estimating an estimated arrival time for the vehicle to arrive at a flexible meeting location, and making modes of transport reservations for the participants on their own routes to reach the destinations. In another embodiment, the traffic data is further included for determining a navigation route, generating one or more routes for the other participants, estimating an estimated arrival time for the participants to arrive at a flexible meeting location, and making modes of transport reservations for the participants on their routes to reach the destinations. The public transport data format may be in General Transit Feed Specification (GTFS), GTFS real-time extensions, REST/ XML, or other industry standards for publishing transportation network and schedule data. In one embodiment, the public transport can include but is not limited to on-demand services (e.g., taxis, shared vehicles, etc.) and fixed-route services such as city buses, trolleybuses, trams (or light rail) and participant trains, rapid transit (metro/subway/underground, etc.), ferries, airlines, coaches, intercity rail, etc.

In one embodiment, the modes of transport data can include any mode of transport data item used by the routing platform 105 including, but not limited to mode of transport type data, mode of transport ownership data, real-time trajectory data, stopping/parking instance data, timestamp information for the stopping/parking instance data, etc. for determining a navigation route, generating one or more routes for the other participants, estimating an estimated arrival time for the participants to arrive at a flexible meeting location, and making modes of transport reservations for the participants on the routes to reach the flexible meeting locations.

In another embodiment, the traffic data is further included for determining a navigation route, generating one or more routes for the other participants, estimating an estimated arrival time for the participants to arrive at a flexible meeting location, and making modes of transport reservations for the participants on the routes to reach the flexible meeting locations. In one embodiment, the traffic data can include, but not limited to, travel speeds, congestions, detours, mode of transport types and volumes, accidents, road conditions, road works, etc. on specific road segments.

In one embodiment, the user profile data includes, but not limited to, the name, name, login named, screen named, nicknamed, handle names, home addresses, email addresses, government identification numbers, operator license/credential types (motorcycle, regular participant vehicle, commercial vehicle, etc.), vehicle registration plate numbers, face, fingerprints, handwriting, credit card numbers, digital identities, date of birth, age, birthplace, genetic information (e.g., gender, race, etc.), telephone numbers, marriage status/records, criminal records, purchase records, financial data, activity records, employment records, insurance records, medical records, political and non-political affiliations, preferences (e.g., POIs), calendar data, driving history data, vehicle sharing data, etc. of the user.

More, fewer or different data records can be provided in the transportation database 113. One or more portions, components, areas, layers, features, text, and/or symbols of the routing data records in the transportation database 113 can be stored in, linked to, and/or associated with one or more of the data records of the geographic database 115 (such as mapping and/or navigation data).

Figure 6:
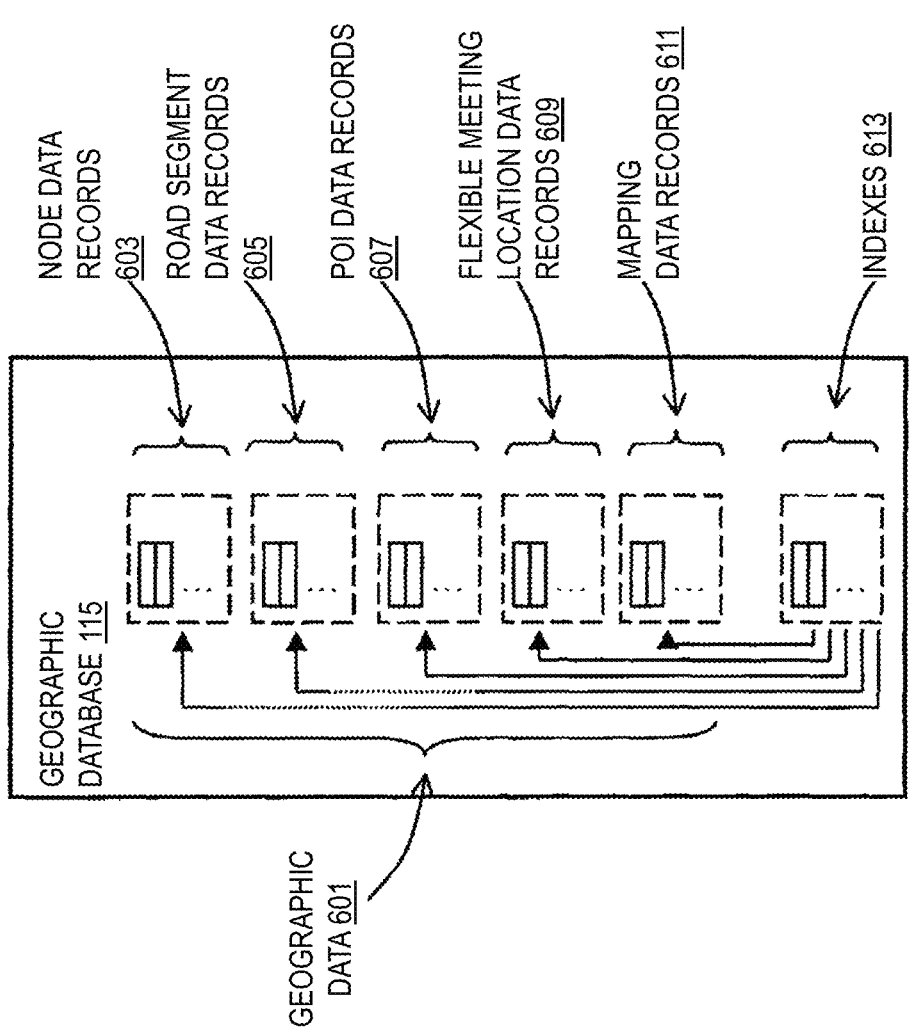
FIG. 6 is a diagram of a geographic database, according to one embodiment.

FIG. 6 is a diagram of a geographic database (such as the database 115), according to one embodiment. In one embodiment, the geographic database 111 includes geographic data 601 used for (or configured to be compiled to be used for) mapping and/or navigation-related services, such as for video odometry based on the parametric representation of lanes include, e.g., encoding and/or decoding parametric representations into lane lines. In one embodiment, the geographic database 115 include high resolution or high definition (HD) mapping data that provide centimeter-level or better accuracy of map features. For example, the geographic database 115 can be based on Light Detection and Ranging (LiDAR) or equivalent technology to collect very large numbers of 3D points depending on the context (e.g., a single street/scene, a country, etc.) and model road surfaces and other map features down to the number lanes and their widths. In one embodiment, the mapping data (e.g., mapping data records 611) capture and store details such as the slope and curvature of the road, lane markings, roadside objects such as signposts, including what the signage denotes. By way of example, the mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 115.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 115 follows certain conventions. For example, links do not cross themselves and do not cross each other except at a node. Also, there are no duplicated shape points, nodes, or links. Two links that connect each other have a common node. In the geographic database 115, overlapping geographic features are represented by overlapping polygons. When polygons overlap, the boundary of one polygon crosses the boundary of the other polygon. In the geographic database 115, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 115 includes node data records 603, road segment or link data records 605, POI data records 607, flexible meeting location data records 609, mapping data records 611, and indexes 613, for example. More, fewer or different data records can be provided. In one embodiment, additional data records (not shown) can include cartographic ("carto") data records, routing data, and maneuver data. In one embodiment, the indexes 613 may improve the speed of data retrieval operations in the geographic database 115. In one embodiment, the indexes 613 may be used to quickly locate data without having to search every row in the geographic database 115 every time it is accessed. For example, in one embodiment, the indexes 613 can be a spatial index of the polygon points associated with stored feature polygons.

In exemplary embodiments, the road segment data records 605 are links or segments representing roads, streets, or paths, as can be used in the calculated route or recorded route information for determination of one or more personalized routes. The node data records 603 are end points (such as intersections) corresponding to the respective links or segments of the road segment data records 605. The road link data records 605 and the node data records 603 represent a road network, such as used by vehicles, cars, and/or other entities. Alternatively, the geographic database 115 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 115 can include data about the POIs and their respective locations in the POI data records 607. The geographic database 115 can also include data about places, such as cities, towns, or other communities, and other geographic features, such as bodies of water, mountain ranges, etc. Such place or feature data can be part of the POI data records 607 or can be associated with POIs or POI data records 607 (such as a data point used for displaying or representing a position of a city). In one embodiment, certain attributes, such as lane marking data records, mapping data records and/or other attributes can be features or layers associated with the link-node structure of the database.

In one embodiment, the geographic database 115 can also include flexible meeting location data records 609 for storing flexible meeting location data, flexible meeting resource data navigation route data, training data, prediction models, annotated observations, computed featured distributions, sampling probabilities, and/or any other data generated or used by the system 100 according to the various embodiments described herein. By way of example, the flexible meeting location data records 609 can be associated with one or more of the node records 603, road segment records 605, and/or POI data records 607 to support localization or visual odometry based on the features stored therein and the corresponding estimated quality of the features. In this way, the records 609 can also be associated with or used to classify the characteristics or metadata of the corresponding records 603, 605, and/or 607.

In one embodiment, as discussed above, the mapping data records 611 model road surfaces and other map features to centimeter-level or better accuracy. The mapping data records 611 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the mapping data records 611 are divided into spatial partitions of varying sizes to provide mapping data to modes of transport 103 and other end user devices with near real-time speed without overloading the available resources of the modes of transport 103 and/or devices (e.g., computational, memory, bandwidth, etc. resources).

In one embodiment, the mapping data records 611 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the mapping data records 611.

In one embodiment, the mapping data records 611 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 115 can be maintained by the content provider 121 in association with the services platform 117 (e.g., a map developer). The map developer can collect geographic data to generate and enhance the geographic database 115. There can be different ways used by the map developer to collect data. These ways can include obtaining data from other sources, such as municipalities or respective geographic authorities. In addition, the map developer can employ field personnel to travel by vehicle (e.g., modes of transport 103 and/or UEs 101) along roads throughout the geographic region to observe features and/or record information about them, for example. Also, remote sensing, such as aerial or satellite photography, can be used.

The geographic database 115 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a mode of transport 103 or a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The transportation database 113 and/or the geographic database 115 can be maintained by the content provider in association with the service platform 117 (e.g., a map developer). The map developer can collect driving/parking data and geographic data to generate and enhance the transportation database 113 and/or the geographic database 115. There can be different ways used by the map developer to collect data. These ways can include obtaining data from other sources, such as municipalities or respective geographic authorities.

The transportation database 113 and/or the geographic database 115 can be stored in a format that facilitates updating, maintenance, and development of the relevant data. For example, the data in the transportation database 113 and/or the geographic database 115 can be stored in an Oracle spatial format or other spatial format. The Oracle spatial format can be compiled into a delivery format, such as a geographic data files (GDF) format to be compiled or further compiled to form geographic database products or databases, which can be used in end user navigation devices or systems.

As mentioned above, the transportation database 113 and the geographic database 115 are separated databases, but in alternate embodiments, the transportation database 113 and the geographic database 115 are combined into one database that can be used in or with end user devices (e.g., UEs 101) to provide navigation-related functions and provide shared vehicle information. For example, the databases 113, 115 are accessible to the UE 101 directly or via the routing platform 105. In another embodiments, the databases 113, 115 can be downloaded or stored on UE 101, such as in applications 111.

The processes described herein for providing a navigation route for a requesting entity to meet other entities at flexible meeting locations may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
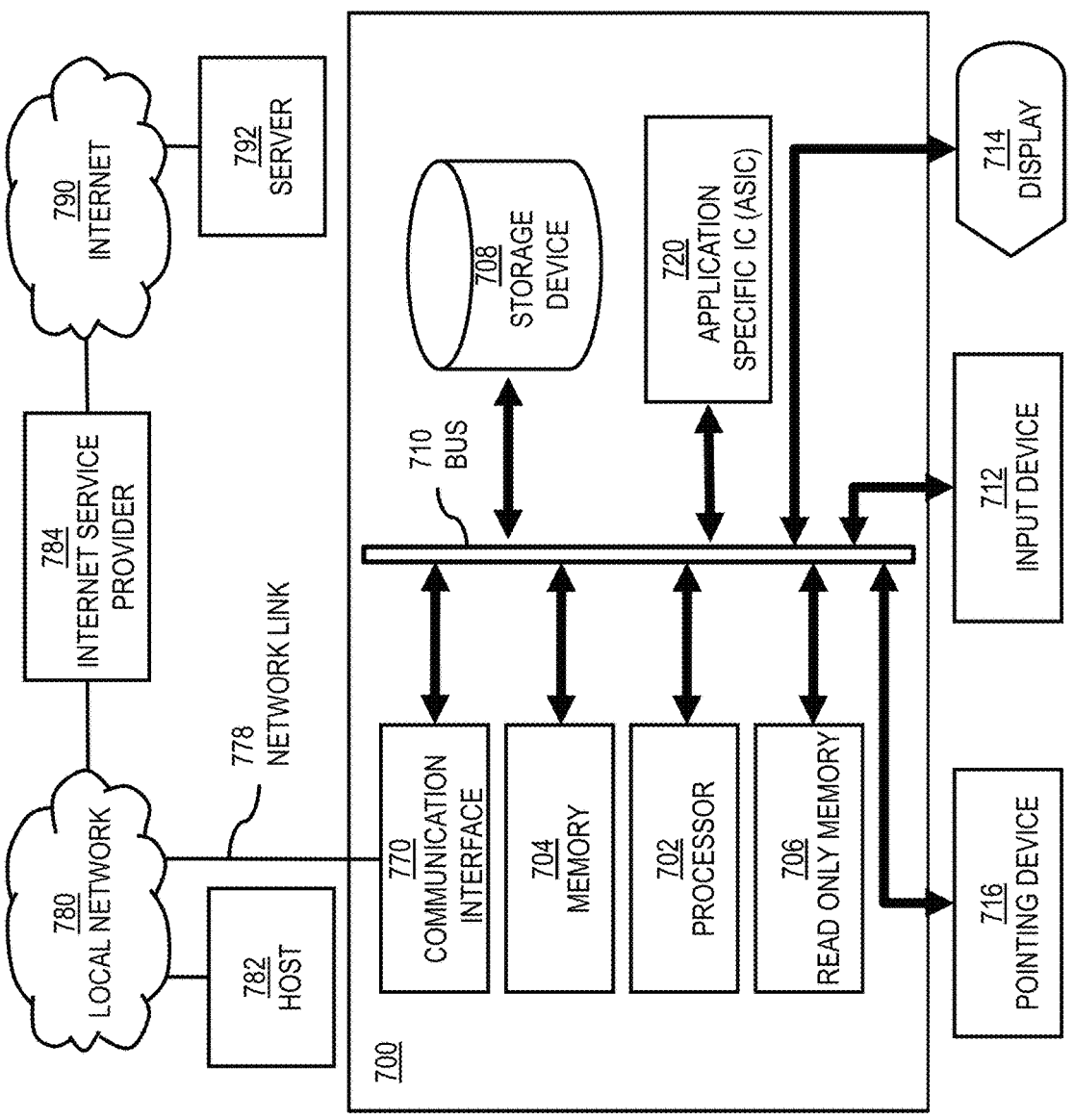
FIG. 7 is a diagram of hardware that can be used to implement an embodiment of the invention.

FIG. 7 illustrates a computer system 700 upon which an embodiment of the invention may be implemented. Computer system 700 is programmed (e.g., via computer program code or instructions) to provide a navigation route for a requesting entity to meet other entities at flexible meeting locations as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to providing a navigation route for a requesting entity to meet other entities at flexible meeting locations. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for providing a navigation route for a requesting entity to meet other entities at flexible meeting locations. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, which is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, which persists even when the computer system 700 is turned off or otherwise loses power.

Information, including instructions for providing a navigation route for a requesting entity to meet other entities at flexible meeting locations, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, which carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 107 for providing a navigation route for a requesting entity to meet other entities at flexible meeting locations.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system can be deployed in various configurations within other computer systems, e.g., host 782 and server 792.

FIG. 8 illustrates a chip set 800 upon which an embodiment of the invention may be implemented. Chip set 800 is programmed to provide a navigation route for a requesting entity to meet other entities at flexible meeting locations as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide a navigation route for a requesting entity to meet other entities at flexible meeting locations. The memory 805 also stores the data associated with or generated by the execution of the inventive steps.

Figure 9:
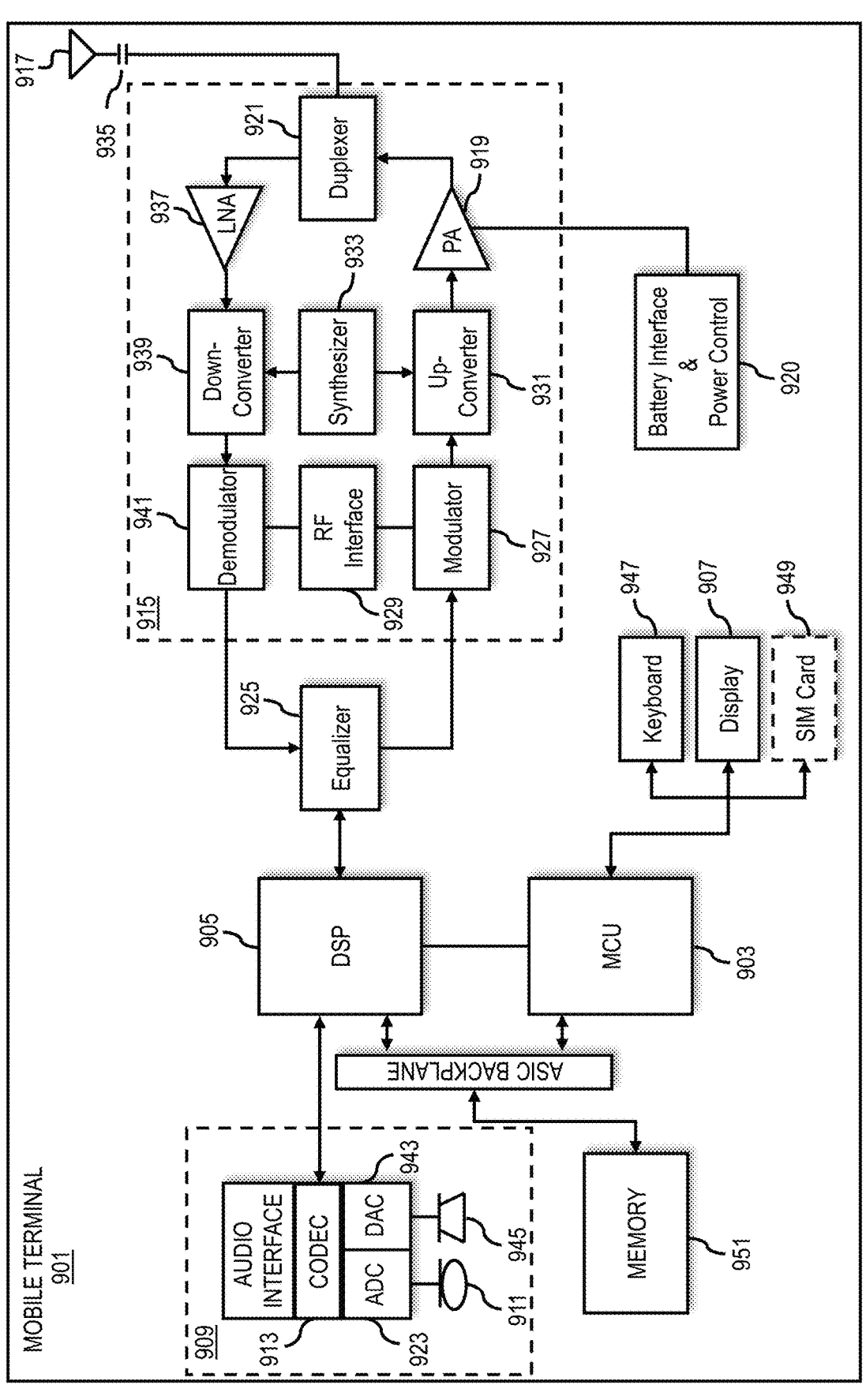
FIG. 9 is a diagram of a mobile terminal (e.g., mobile computer) that can be used to implement an embodiment of the invention.

FIG. 9 is a diagram of exemplary components of a mobile terminal 901 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions that offer automatic contact matching. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile station 901 to provide a navigation route for a requesting entity to meet other entities at flexible meeting locations. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 951 may be, but not limited to, a single memory, CD, DVD, ROM, RAM, EEPROM, optical storage, or any other non-volatile or non-transitory storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving, via a communication interface, a request to generate a navigation route for a requesting entity to visit a plurality of entities via a multi-stop tour with respective meeting locations, wherein one or more mobile entities of the plurality of entities are associated with a maximum travel distance, a maximum travel time, or a combination thereof that the one or more mobile entities are to move from a current location of each of the one or more mobile entities to the respective meeting locations during the navigation route;
computing, by at least one processor, respective isolines around each mobile entity based on the maximum travel distance, the maximum travel time, or a combination thereof;
connecting, by at least one processor, at least the respective isolines around each mobile entity to determine the navigation route;
providing the navigation route as an output in a navigation user interface;
receiving, via the communication interface, real-time trajectory data from one or more location sensors of one or more devices associated with the requesting entity, the one or more mobile entities, or a combination thereof; and
in response to receiving the real-time trajectory data, automatically re-computing, by the at least one processor, the navigation route and adjusting the navigation user interface based on the re-computed navigation route.

2. The method of claim 1, wherein the connecting of the respective isolines comprises generating a polygon that connects the respective isolines with a starting point of the navigation route.

3. The method of claim 2, wherein the polygon is a convex hull.

4. The method of claim 2, wherein the navigation route comprises a sequence of the respective meeting locations for each entity to meet the requesting entity along the navigation route.

5. The method of claim 4, wherein the navigation route further comprises respective meeting times for each entity based on an estimated time of arrival at each of the respective meeting locations by the requesting entity.

6. The method of claim 5, further comprising:
monitoring a progress of the requesting entity moving along the navigation route;
recomputing the navigation route, the respective meeting locations, the respective meeting times, or a combination thereof based on determining that the progress indicates a delay above a threshold value; and
transmitting the recomputed route, the recomputed meeting locations, the recomputed meeting times, or a combination thereof to the requesting entity, one or more of the plurality of entities, or a combination thereof.

7. The method of claim 5, further comprising:
determining a context associated with visiting each entity; and
determining the respective meeting locations, the respective meeting times, or a combination thereof based on the context.

8. The method of claim 5, further comprising:

determining a meeting resource to be used at the respective meeting locations; and
initiating at least one of:
a reservation of the meeting resource based on the respective meeting locations, the respective meeting times, or a combination thereof;
a delivery of the meeting resource based on the respective meeting locations, the respective meeting times, or a combination thereof; and
a creation of a list of the meeting resource.

9. The method of claim 4, further comprising:
selecting the respective meeting locations within one or more areas located between the navigation route, the isolines, or a convex hull connecting the current location of each mobile entity.

10. The method of claim 1, wherein the navigation route is a walking route, and wherein the plurality of entities includes a plurality of people that a requesting entity of the navigation route wants to meet.

11. The method of claim 1, further comprising:
optimizing the navigation route based on at least one of scenery, time, privacy, weather, noise, traffic, or a combination thereof.

12. An apparatus comprising:
at least one processor; and
at least one memory including computer program code for one or more programs,
the at least one memory and the computer program code configured to, with the at least one processor, cause the apparatus to perform at least the following,
retrieve, via a communication interface, a request to generate a navigation route for a requesting entity to visit a plurality of entities via a multi-stop tour with one or more flexible meeting locations, wherein one or more mobile entities of the plurality of entities are associated with a maximum travel distance, a maximum travel time, or a combination thereof that the one or more mobile entities are to move from a current location of each of the one or more mobile entities to the one or more flexible meeting locations during the navigation route;
compute, by the at least one processor, respective isolines around each mobile entity based on the maximum travel distance, the maximum travel time, or a combination thereof;
connect, by at least one processor, at least the respective isolines around each mobile entity to determine the navigation route;
provide the navigation route as an output in a navigation user interface;
receive, via the communication interface, real-time trajectory data from one or more location sensors of one or more devices associated with the requesting entity, the one or more mobile entities, or a combination thereof; and
in response to receiving the real-time trajectory data, automatically re-compute, by the at least one processor, the navigation route and adjusting the navigation user interface based on the re-computed navigation route.

13. The apparatus of claim 12, wherein the connecting of the respective isolines comprises generating a polygon that connects the respective isolines with a starting point of the navigation route.

14. The apparatus of claim 13, wherein the polygon is a convex hull.

15. The apparatus of claim 13, wherein the navigation route comprises a sequence of the respective meeting locations for each entity to meet the requesting entity along the navigation route.

16. The apparatus of claim 15, wherein the navigation route further comprises respective meeting times for each entity based on an estimated time of arrival at each of the respective meeting locations by the requesting entity.

17. The apparatus of claim 15, wherein the apparatus is further caused to:

select the respective meeting locations within one or more areas located between the navigation route, the isolines, or a convex hull connecting the current location of each mobile entity.

18. A non-transitory computer-readable storage medium carrying one or more sequences of one or more instructions which, when executed by one or more processors, cause an apparatus to perform:

receiving a request to generate a navigation route for a requesting entity to visit a plurality of entities via a multi-stop tour with one or more flexible meeting locations, wherein one or more mobile entities of the plurality of entities are associated with a maximum travel distance, a maximum travel time, or a combination thereof that the one or more mobile entities are to move from a current location of each of the one or more mobile entities to the one or more flexible meeting locations during the navigation route;

computing respective isolines around each mobile entity based on the maximum travel distance, the maximum travel time, or a combination thereof;

connecting at least the respective isolines around each mobile entity to determine the navigation route; and providing the navigation route as an output in a navigation user interface;

receiving, via the communication interface, real-time trajectory data from one or more location sensors of one or more devices associated with the requesting entity, the one or more mobile entities, or a combination thereof; and in response to receiving the real-time trajectory data, automatically re-computing, by the at least one processor, the navigation route and adjusting the navigation user interface based on the re-computed navigation route.

19. The non-transitory computer-readable storage medium of claim 18, wherein the connecting of the respective isolines comprises generating a polygon that connects the respective isolines with a starting point of the navigation route.

20. The non-transitory computer-readable storage medium of claim 19, wherein the polygon is a convex hull.

* * * * *